United States Patent
Winterowd

(10) Patent No.: US 11,603,450 B2
(45) Date of Patent: Mar. 14, 2023

(54) HIGH-CARBON RECOVERED PAPER AND PLASTIC MATERIALS WITH REDUCED ENDOTOXIN LEVELS

(71) Applicant: Continuus Materials Intellectual Property, LLC, The Woodlands, TX (US)

(72) Inventor: Jack G. Winterowd, Puyallup, WA (US)

(73) Assignee: Continuus Materials Intellectual Property, LLC, The Woodlands, TX (US)

( * ) Notice: Subject to any disclaimer, the term of this patent is extended or adjusted under 35 U.S.C. 154(b) by 318 days.

(21) Appl. No.: 17/007,678

(22) Filed: Aug. 31, 2020

(65) Prior Publication Data
US 2022/0064403 A1    Mar. 3, 2022

(51) Int. Cl.
| | | |
|---|---|---|
| *C08K 5/00* | (2006.01) | |
| *B29C 70/52* | (2006.01) | |
| *C08J 3/21* | (2006.01) | |
| *C08J 5/06* | (2006.01) | |

(52) U.S. Cl.
CPC .......... *C08K 5/0058* (2013.01); *B29C 70/528* (2013.01); *C08J 3/212* (2013.01); *C08J 5/06* (2013.01)

(58) Field of Classification Search
CPC ...... C08K 5/0058; B29C 70/528; C08J 3/212; C08J 5/06
USPC .......................................................... 428/527
See application file for complete search history.

(56) References Cited

U.S. PATENT DOCUMENTS

2010/0144905 A1* 6/2010 Reaveley ................. C10G 2/32
44/589

FOREIGN PATENT DOCUMENTS

JP        2001-058173 A      3/2001

OTHER PUBLICATIONS

Foreign Search Report on EP 21193621.6 dated Jan. 24, 2022 (2 pages).
Margel, et al., "Synthesis and Characterization of Poly(glutaraldehyde). A Potential Reagent for Protein Immobilization and Cell Separation", Macromolecules 1980, 13, 19-24.

* cited by examiner

*Primary Examiner* — Hui H Chin
(74) *Attorney, Agent, or Firm* — Foley & Lardner LLP

(57) ABSTRACT

Provided herein are composite materials comprising at least 70 wt. % thermally consolidated recovered paper and plastic fragments and less than 5,000 ng water-soluble endotoxin per gram of composite materials, as well as methods of preparing said composite materials and methods of sanitizing recovered waste materials.

9 Claims, 5 Drawing Sheets

HIGH-CARBON RECOVERED PAPER AND PLASTIC MATERIALS WITH REDUCED ENDOTOXIN LEVELS

FIELD OF DISCLOSURE

The present technology relates generally to the field of recovered paper and/or plastic materials from one or more waste streams including municipal solid waste, materials recycling facility residuals, post-commercial waste, and construction and demolition waste.

SUMMARY

Provided herein in one aspect is a composite material comprising about 70 wt. % to about 99 wt. % of thermally consolidated recovered paper and plastic fragments, about 0.01 wt. % to about 0.40 wt. % of polymerization product of a multifunctional aldehyde, and about 0.0001 wt. % to about 0.02 wt. % of cross-linked endotoxin.

Provided herein in another aspect is a composite material comprising about 70 wt. % to about 99 wt. % of thermally consolidated recovered paper and plastic fragments, about 0.01 wt. % to about 0.40 wt. % of polymerization product of urea-aldehyde adducts, and about 0.0001 wt. % to about 0.02 wt. % of cross-linked endotoxin.

Provided herein in another aspect is a method to prepare a composite material, the method comprising:
compressing and heating a mixture comprising paper fragments or plastic fragments, or a combination thereof, and a multifunctional aldehyde to form the composite material;
wherein the composite material comprises polymerization product of the multifunctional aldehyde; cross-linked endotoxin; and at least about 70 wt. % of the paper fragments or the plastic fragments, or the combination thereof.

Provided herein in another aspect is a method to prepare a composite material, the method comprising:
sorting recovered waste materials to obtain an initial mixture of paper fragments or plastic fragments, or a combination thereof, wherein the paper fragments or the plastic fragments, or the combination thereof comprise gram-negative bacteria;
treating the initial mixture with a multifunctional aldehyde to obtain a treated mixture; and
compressing and heating the treated mixture to form the composite material;
wherein the composite material comprises polymerization product of the multifunctional aldehyde; cross-linked endotoxin; and at least about 70 wt. % of the paper fragments or the plastic fragments, or the combination thereof.

Provided herein in another aspect is a method to prepare a composite material, the method comprising:
compressing and heating a mixture comprising paper fragments or plastic fragments, or a combination thereof, and a urea-aldehyde adduct to form the composite material;
wherein the composite material comprises polymerization product of the urea-aldehyde adduct; cross-linked endotoxin; and at least about 70 wt. % of the paper fragments or the plastic fragments, or the combination thereof.

Provided herein in another aspect is a method to prepare a composite material, the method comprising:
sorting recovered waste materials to obtain an initial mixture of paper fragments or plastic fragments, or a combination thereof, wherein the paper fragments or the plastic fragments, or the combination thereof comprise gram-negative bacteria;
treating the initial mixture with a urea-aldehyde adduct to obtain a treated mixture; and
compressing and heating the treated mixture to form the composite material;
wherein the composite material comprises polymerization product of the urea-aldehyde adduct; cross-linked endotoxin; and at least about 70 wt. % of the paper fragments or the plastic fragments, or the combination thereof.

Provided herein in another aspect is a method to sanitize recovered waste materials, the method comprising:
treating a mixture comprising recovered waste materials with a multifunctional aldehyde to obtain the sanitized recovered waste materials,
wherein the recovered waste materials comprise gram-negative bacteria; and
wherein the sanitized recovered waste materials comprise polymerization product of the multifunctional aldehyde and cross-linked endotoxin.

Provided herein in another aspect is a method to sanitize recovered waste materials, the method comprising:
treating recovered waste materials with a multifunctional aldehyde to obtain a treated mixture, wherein the recovered waste materials comprise gram-negative bacteria; and
conditioning the treated mixture at standard pressure for at least 5 minutes to obtain sanitized recovered waste materials;
wherein the sanitized recovered waste materials polymerization product of the multifunctional aldehyde and cross-linked endotoxin.

Provided herein in another aspect is a method to sanitize recovered waste materials, the method comprising:
treating a mixture comprising recovered waste materials with a urea-aldehyde adduct to obtain the sanitized recovered waste materials;
wherein the recovered waste materials comprise gram-negative bacteria; and
wherein the sanitized recovered waste materials comprise polymerization product of the urea-aldehyde adduct and cross-linked endotoxin.

Provided herein in another aspect is a method to sanitize recovered waste materials, the method comprising:
treating recovered waste materials with a urea-aldehyde adduct to obtain a treated mixture, wherein the recovered waste materials comprise gram-negative bacteria; and
conditioning the treated mixture at standard pressure for at least 5 minutes to obtain sanitized recovered waste materials;
wherein the sanitized recovered waste materials comprise polymerization product of the urea-aldehyde adduct and cross-linked endotoxin.

DETAILED DESCRIPTION

Figure 1:
FIG. 1 depicts a non-limiting example of an initial mixture of recovered paper and plastic fragments after sorting processes of material from one or more waste streams including municipal solid waste, materials recycling facility residuals, post-commercial waste, and construction and demolition waste.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "municipal solid waste" or "MSW" refers to residential or commercial waste streams such as garbage/rubbish consisting of everyday items that are discarded by the public, food waste, non-recyclable plastics, packaging, yard waste, etc. MSW can include, but is not limited to, heavy weight materials (e.g., aggregates, glass, textiles, rubber, etc.), medium weight materials (e.g., fibers and rigid plastics), plastics, ferrous and non-ferrous metals, inert materials and residue (e.g., sand, rock, concrete, etc.), organic materials (e.g., food waste), very heavy and/or bulky materials (e.g., tires, mattresses, post-consumer carpet), the residuals produced from the separation of recycled household materials, and any combination thereof. As used herein, the term "fibers" refers to paper, cardboard, and other cellulose-based materials, the term "plastics" refers to rigid plastics, foam plastics, film plastics, PVC plastics, and like materials. MSW does not generally contain medical waste, radioactive waste, hazardous waste, agricultural waste or sewer sludge. On average, MSW consists of food (15.2%), paper/paperboard (25.0%), plastics (13.2%), yard trimmings (13.1%), and other materials (33.5%).

As used herein, "thermally consolidated" refers to being compressed under a temperature above ambient temperature.

As used herein, "standard pressure" refers to 1 atm or 14.7 psi.

As used herein, a "building product" refers to a product used in the construction of residential or commercial buildings. Non-limiting examples of a building product include drywall, wallboard, construction sheeting (e.g., roofing board), I-joist, trim, and exterior or interior sheathing.

As used herein, a "multifunctional aldehyde" refers to a compound with at least two aldehyde moieties. In some embodiments, a multifunctional aldehyde has 2, 3, 4, or 5 aldehyde moieties. In some embodiments, a multifunctional aldehyde has 2 aldehyde moieties. In some embodiments, a multifunctional aldehyde has 3 aldehyde moieties. In some embodiments, a multifunctional aldehyde has 4 aldehyde moieties. In some embodiments, a multifunctional aldehyde has 5 aldehyde moieties.

As used herein, a "polyaldehyde" is a self-polymerized product of multifunctional aldehyde.

Municipal Solid Waste

Municipal solid waste (MSW) contains significant populations of microorganisms (including bacteria and fungi), which predominantly stem from the food and yard waste. Within the landfill environment these organisms effectively decompose the garbage in a digestion process that yields both carbon dioxide and methane as by-products. In 2017, the EPA reported that landfills were the third-largest contributor to anthropogenic methane in the US. In general, methane is believed to be about 20 times more potent than carbon dioxide as a green-house gas. Increased levels of green-house gases in the earth's atmosphere are widely believed to be contributing to global warming. According to the EPA Waste Reduction Model (WARM), the combined methane and carbon dioxide emissions from landfills in 2019 was about 132 MM metric tons (expressed as carbon dioxide equivalents). The paper and plastic components in the MSW were estimated to have contributed about 18.4 MM and 26.8 MM metric tons (carbon dioxide equivalents), respectively, to this total. The combustion of MSW for energy in 2019 contributed about 4.5 MM metric tons of carbon dioxide to the atmosphere.

Thus, there is a general need to identify new technologies that effectively divert MSW away from landfills and into new applications that are not associated with increased emission of green-house gases.

One strategy involves the conversion of MSW, or specific components of MSW, such as paper and plastic, into building products. Paper and plastic components within MSW have properties that are suitable for use in building products. For example, a roof cover board, sold as EVERBOARD™, is mostly comprised of recovered paper and plastic. When used in the production of building products, such as composite panels, the recovered paper components contribute to strength and stiffness properties, while recovered plastic components can either function as binders or can also contribute to strength and stiffness.

Recovered Paper/Plastic

Recovered paper and recovered plastic contain significant levels of carbon. Specifically, the carbon content of recovered paper is about 40-45%, while the carbon content of recovered polyethylene and recovered polypropylene (recovered plastic resins) is about 85-86%. Since building products are typically durable goods that are installed in buildings and/or homes and then left in place for long periods of time, the incorporation of recovered paper and recovered plastic in building products represents a significant carbon sequestration opportunity.

Recovered paper and recovered plastic can be obtained from MSW or recycling streams by use of various sorting processes that separate the different components. It is recognized that food and yard waste in MSW are generally associated with substantial levels of microbial activity. To the extent that paper and plastic in MSW are generally comingled with food and yard trimmings, it would be expected to detect bacteria and fungi on recovered paper and recovered plastic that has been isolated from MSW. Surprisingly, bacteria and fungi can also reside in recovered paper and recovered plastic that are derived from some recycling streams.

Based on consumer expectations as well as health and safety issues, recovered paper and recovered plastic must be sterilized when these materials are being used to make building products. Most of the bacteria and fungi activity (>95%) in recovered paper and recovered plastic can be arrested by pressing these materials between hot platens (350-400° F.) for several minutes such that the temperature of the paper and plastic is increased to about 260° F. or higher. These processing conditions are common for the production of composite building products. Unfortunately, composite products based on recovered paper and plastic can incur significant microorganism blooms, post-heating, if they become wet, which could occur as a result of exposure to rain during installation of the building product. The microorganism blooms can occur even if the composite is exposed to water that is known to be sterile.

Potential options exist for sterilizing recovered paper and recovered plastic that could be used to make building products. These can generally be classified as thermal, radiation, or chemical treatments.

Heat (thermal) is a practical and safe approach that is often already part of the basic process used to make composites. Furthermore, heat-treatment does provide some significant reduction in microbial activity. Unfortunately, the maximum temperature and time of heating are commonly limited by both economic dynamics as well as material property limitations and conflicts with the primary processing objectives. Thus, in most cases heat from raw material dryers and/or hot-presses is not sufficient to achieve a complete level of sterilization.

Radiation options include electron beam treatment, which is typically effective for thin materials and/or surface treatments. However, these treatments are associated with high capital investments, high energy costs, slow processing speeds, and employee radiation exposure risks.

Biocide chemicals are yet another sterilization option. Many biocide chemicals are strong oxidizing agents, such as hydrogen peroxide, bleach and peracetic acid. These biocides are corrosive to metal equipment that is commonly used in the composite manufacturing process. Other potential biocides, such as formaldehyde, chlorine, or ethylene oxide, are acutely toxic, and have significant volatility. This combination of properties presents a significant safety management challenge for the production environment. Other biocides based on heavy metals, such as micronized copper, chromium, arsenic, and silver sulfadiazine, are persistent in the finished product and can present environmental leachate concerns and/or health hazards for workers who will be handling and installing the building product. In some cases, chemical biocides that work appropriately for building products based on wood or fiber cement, will not have sufficient efficacy for recovered paper and recovered plastic. Examples of such biocides include borates. Likewise, iodine-based biocides might lack sufficient efficacy for use on MSW. Yet another biocide used in some building products is propiconazole, which can be effective against certain types of fungi, but might not be sufficiently effective against a broad spectrum of fungi and bacteria. There are also cases in which the chemical properties of a biocide can be incompatible with the chemical properties of other additives used to make the building product. For instance, certain nucleophilic biocides, such as phenols, bisphenols, halogenated phenols, and halogenated bisphenols, including triclosan, or biguanides, such as chlorhexidine, might coagulate or prematurely cure certain adhesives, such as polymeric diphenyl methane diisocyanate (pMDI), in the building product. Chemical sanitizing technologies exist, which are based on treating a contaminated substrate with aqueous solutions of quaternary ammonium compounds and optionally additional biocides. The treated material is allowed to age for a period of time sufficient for the quaternary ammonium compounds and optionally other biocides to kill the microorganisms, and then the treated material is rinsed with water. However, a water-based system is not appropriate for use on recovered paper and recovered plastic materials because the paper component absorbs large amounts of water, which must then be removed in energy-intensive drying procedures. Furthermore, it is not an option to simply omit the rinsing step because the residual quaternary ammonium compounds can have deleterious effects on the resistance of the resulting building product to water. Thus, sterilization and preservation treatments that are commonly used in the building products industry are not suitable for use in composites based on contaminated recovered paper and contaminated recovered plastic.

Some sources of recovered paper and recovered plastic contain gram-negative bacteria. These bacteria are known to secrete lipopolysaccharides from their outer cell wall. The secretion can occur from both living and dead gram-negative bacteria. The lipopolysaccharides are commonly referred to as "endotoxin". For a portion of the human population, endotoxin can cause an asthma-type response when inhaled. Exposure to endotoxin most commonly occurs when people inhale dust particles that contain gram-negative bacteria; however, endotoxins are generally soluble in water, and it is also possible for aerosolized water droplets that contain dissolved endotoxin to be inhaled. Specifically, steam can develop within a hot-press during the production of building products based on recovered paper and recovered plastic. If gram-negative bacteria are present (dead or alive) in the recovered paper and recovered plastic, then this steam dissolves the endotoxin from the bacteria outer cell wall. As steam is emitted from the hot-press, either during hot-pressing, and/or when the press opens, the steam/endotoxin mixture is emitted into the work area. Under these conditions, workers located near or operating the hot-press are exposed to endotoxin. This is a particularly challenging situation, because simply killing the bacteria prior to hot-pressing does not eliminate the endotoxin in the outer cell wall of the gram-negative bacteria. Potentially, one could kill the bacteria and wash them off of the paper and plastic prior to hot-pressing, but this approach creates a new dilemma involving cost-effective processing of the resulting wash-water that contains endotoxin. This washing process would also substantially increase the moisture content of the recovered paper material, which would necessitate additional drying steps.

Hence, a sterilization technology is needed for the production of building products that are based on biologically-contaminated, high-carbon content, recovered paper and plastic. In order to achieve 1) sterilization, 2) low levels of water-soluble endotoxin, and 3) compatibility with a composite manufacturing process, the sterilization technology should satisfy the following requirements:

It must substantially reduce the level of water-soluble endotoxin in the contaminated recovered paper and contaminated recovered plastic that are used to make building products.

It must be safe and cost-effective to incorporate into a building product manufacturing process.

It must be compatible with other additives in the building products, including adhesives, such as pMDI.

It must be converted into an inert material after achieving sterilization such that hazardous properties do not persist in the finished building products.

It must eliminate the tendency of building products (that are based on contaminated recovered paper and contaminated recovered plastic) to incur bacteria or fungal blooms when exposed to water.

The technology disclosed herein meets these requirements.

Composite Materials

In one aspect, provided herein a composite material comprising thermally consolidated recovered paper and plastic fragments and less than 5,000 ng water-soluble endotoxin per gram of composite material.

Without being bound to theory, an exogenously applied multifunctional aldehyde cross-links endotoxin when used according to the technology described herein, rendering the endotoxin water-insoluble. The multifunctional aldehyde also forms a self-polymerized product of multifunctional aldehyde, i.e., a polyaldehyde. In some embodiments, the polyaldehyde cross-links endotoxin, when used according to the technology described herein, forming a polymerization product of polyaldehyde and endotoxin, which also results in water-insoluble endotoxin. In some embodiments, multifunctional aldehyde is used in excess with respect to the endotoxin such that a majority of the multifunctional aldehyde self-polymerizes and does not interact with endotoxin and a minority of the multifunctional aldehyde, as itself or as a polyaldehyde, cross-links with endotoxin.

Accordingly, in another aspect, provided herein is a composite material comprising about 70 wt. % to about 99 wt. % of thermally consolidated recovered paper and plastic fragments, about 0.01 wt. % to about 0.40 wt. % of a polymerization product of a multifunctional aldehyde, and about 0.0001 wt. % to about 0.02 wt. % of cross-linked endotoxin.

A multifunctional aldehyde may also be used as a urea-aldehyde adduct. As used herein, an "urea-aldehyde adduct" refers to the product of a reaction between urea ($NH_2C(O)NH_2$) and multifunctional aldehyde, a non-limiting example of which is shown below:

urea-aldehyde adducts may also cross-link with endotoxin, rendering the endotoxin water-insoluble. In some embodiments, the urea-aldehyde adduct is used in excess with respect to the endotoxin such that a majority of the urea-aldehyde adduct self-polymerizes and does not interact with endotoxin and a minority of the urea-aldehyde adduct, as itself or as a self-polymerized product, cross-links with endotoxin.

Accordingly, in another aspect, provided herein is a composite material comprising about 70 wt. % to about 99 wt. % of thermally consolidated recovered paper and plastic fragments, about 0.01 wt. % to about 0.40 wt. % of a polymerization product of urea-aldehyde adducts, and about 0.0001 wt. % to about 0.02 wt. % of cross-linked endotoxin.

The composite material comprises about 70 wt. % to about 99 wt. % of thermally consolidated recovered paper and plastic fragments. This includes about 70 wt. %, about 71 wt. %, about 72 wt. %, about 73 wt. %, about 74 wt. %, about 75 wt. %, about 76 wt. %, about 77 wt. %, about 78 wt. %, about 79 wt. %, about 80 wt. %, about 81 wt. %, about 82 wt. %, about 83 wt. %, about 84 wt. %, about 85 wt. %, about 86 wt. %, about 87 wt. %, about 88 wt. %, about 89 wt. %, about 90 wt. %, about 91 wt. %, about 92 wt. %, about 93 wt. %, about 94 wt. %, about 95 wt. %, about 96 wt. %, about 97 wt. %, about 98 wt. %, or about 99 wt. %, including increments therein, of thermally consolidated recovered paper and plastic fragments.

In some embodiments, the composite material comprises about 75 wt. % to about 99 wt. %, about 80 wt. % to about 99 wt. %, about 85 wt. % to about 99 wt. %, about 90 wt. % to about 99 wt. %, about 95 wt. % to about 99 wt. %, about 70 wt. % to about 98 wt. %, about 75 wt. % to about 98 wt. %, about 80 wt. % to about 98 wt. %, about 85 wt. % to about 98 wt. %, about 90 wt. % to about 98 wt. %, about 95 wt. % to about 98 wt. %, about 70 wt. % to about 97 wt. %, about 75 wt. % to about 97 wt. %, about 80 wt. % to about 97 wt. %, about 85 wt. % to about 97 wt. %, about 90 wt. % to about 97 wt. %, about 95 wt. % to about 97 wt. %, about 70 wt. % to about 96 wt. %, about 75 wt. % to about 96 wt. %, about 80 wt. % to about 96 wt. %, about 85 wt. % to about 96 wt. %, about 90 wt. % to about 96 wt. %, or about 95 wt. % to about 96 wt. % of thermally consolidated recovered paper and plastic fragments.

In some embodiments, the composite material disclosed herein comprises a polymerization product of multifunc- The urea-aldehyde adduct refers to the initial reaction product (i.e., prior to condensation), or the condensation product or a combination of thereof.

Different ratios of urea and multifunctional aldehyde may be used to prepare the urea-aldehyde adduct. In some embodiments, the ratio of multifunctional aldehyde to urea is greater than 1. In some embodiments, the ratio of multifunctional aldehyde to urea is greater than 2. In some embodiments, the ratio of multifunctional aldehyde to urea is 1.5, 2, 3, 4, 5, or 6. Without being bound to theory, the urea-aldehyde adduct and/or the self-polymerized product of tional aldehyde. The polymerization product may be endotoxin cross-linked with a multifunctional aldehyde, endotoxin cross-linked with a polyaldehyde, or a polyaldehyde that has not reacted with endotoxin, or any combination thereof. In some embodiments, the multifunctional aldehyde is selected from the group consisting of glyoxal, malondialdehyde, succinic dialdehyde, glutaraldehyde, phthalaldehyde, or a combination of two or more thereof. In some embodiments, the multifunctional aldehyde is selected from the group consisting of malondialdehyde, succinic dialdehyde, glutaraldehyde, phthalaldehyde, or a combination of two or more thereof. In some embodiments, the multifunctional aldehyde is glyoxal. In some embodiments, the multifunctional aldehyde is not glyoxal. In some embodiments, the multifunctional aldehyde is malondialdehyde. In some embodiments, the multifunctional aldehyde is succinic dialdehyde. In some embodiments, the multifunctional aldehyde is glutaraldehyde. In some embodiments, the multifunctional aldehyde is phthalaldehyde.

In some embodiments, the composite material comprises about 0.01 wt. % to about 0.40 wt. % of a polymerization product of multifunctional aldehyde. This includes about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.10 wt. %, about 0.11 wt. %, about 0.12 wt. %, about 0.13 wt. %, about 0.14 wt. %, about 0.15 wt. %, about 0.16 wt. %, about 0.17 wt. %, about 0.18 wt. %, about 0.19 wt. %, about 0.20 wt. %, about 0.21 wt. %, about 0.22 wt. %, about 0.23 wt. %, about 0.24 wt. %, about 0.25 wt. %, about 0.26 wt. %, about 0.27 wt. %, about 0.28 wt. %, about 0.29 wt. %, about 0.30 wt. %, about 0.31 wt. %, about 0.32 wt. %, about 0.33 wt. %, about 0.34 wt. %, about 0.35 wt. %, about 0.36 wt. %, about 0.37 wt. %, about 0.38 wt. %, about 0.39 wt. %, or about 0.40 wt. %, including increments therein, of a polymerization product of multifunctional aldehyde.

In some embodiments, the composite material comprises about 0.01 wt. % to about 0.35 wt. %, about 0.01 wt. % to about 0.30 wt. %, about 0.01 wt. % to about 0.25 wt. %, about 0.01 wt. % to about 0.20 wt. %, about 0.01 wt. % to about 0.15 wt. %, about 0.01 wt. % to about 0.10 wt. %, about 0.05 wt. % to about 0.40 wt. %, about 0.05 wt. % to about 0.35 wt. %, about 0.05 wt. % to about 0.30 wt. %, about 0.05 wt. % to about 0.25 wt. %, about 0.05 wt. % to about 0.20 wt. %, about 0.05 wt. % to about 0.15 wt. %, about 0.05 wt. % to about 0.10 wt. %, about 0.10 wt. % to about 0.40 wt. %, about 0.10 wt. % to about 0.35 wt. %, about 0.10 wt. % to about 0.30 wt. %, about 0.10 wt. % to about 0.25 wt. %, about 0.10 wt. % to about 0.20 wt. %, or about 0.10 wt. % to about 0.15 wt. % of a polymerization product of multifunctional aldehyde.

In some embodiments, the multifunctional aldehyde comprised in the urea-aldehyde adduct is selected from the group consisting of glyoxal, malondialdehyde, succinic dialdehyde, glutaraldehyde, phthalaldehyde, or a combination of two or more thereof. In some embodiments, the multifunctional aldehyde comprised in the urea-aldehyde adduct is selected from the group consisting of malondialdehyde, succinic dialdehyde, glutaraldehyde, phthalaldehyde, or a combination of two or more thereof. In some embodiments, the multifunctional aldehyde is glyoxal. In some embodiments, the multifunctional aldehyde is not glyoxal. In some embodiments, the multifunctional aldehyde is malondialdehyde. In some embodiments, the multifunctional aldehyde is succinic dialdehyde. In some embodiments, the multifunctional aldehyde is glutaraldehyde. In some embodiments, the multifunctional aldehyde is phthalaldehyde.

In some embodiments, the composite material disclosed herein comprises a polymerization product of urea-aldehyde adducts. The polymerization product may be endotoxin cross-linked with a urea-aldehyde adduct, endotoxin cross-linked with a self-polymerized product of urea-aldehyde adducts, or a self-polymerized product of urea-aldehyde adducts that has not reacted with endotoxin, or any combination thereof.

In some embodiments, the composite material comprises about 0.01 wt. % to about 0.40 wt. % of a polymerization product of urea-aldehyde adducts. This includes about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.10 wt. %, about 0.11 wt. %, about 0.12 wt. %, about 0.13 wt. %, about 0.14 wt. %, about 0.15 wt. %, about 0.16 wt. %, about 0.17 wt. %, about 0.18 wt. %, about 0.19 wt. %, about 0.20 wt. %, about 0.21 wt. %, about 0.22 wt. %, about 0.23 wt. %, about 0.24 wt. %, about 0.25 wt. %, about 0.26 wt. %, about 0.27 wt. %, about 0.28 wt. %, about 0.29 wt. %, about 0.30 wt. %, about 0.31 wt. %, about 0.32 wt. %, about 0.33 wt. %, about 0.34 wt. %, about 0.35 wt. %, about 0.36 wt. %, about 0.37 wt. %, about 0.38 wt. %, about 0.39 wt. %, or about 0.40 wt. %, including increments therein, of a polymerization product of urea-aldehyde adducts.

In some embodiments, the composite material comprises about 0.01 wt. % to about 0.35 wt. %, about 0.01 wt. % to about 0.30 wt. %, about 0.01 wt. % to about 0.25 wt. %, about 0.01 wt. % to about 0.20 wt. %, about 0.01 wt. % to about 0.15 wt. %, about 0.01 wt. % to about 0.10 wt. %, about 0.05 wt. % to about 0.40 wt. %, about 0.05 wt. % to about 0.35 wt. %, about 0.05 wt. % to about 0.30 wt. %, about 0.05 wt. % to about 0.25 wt. %, about 0.05 wt. % to about 0.20 wt. %, about 0.05 wt. % to about 0.15 wt. %, about 0.05 wt. % to about 0.10 wt. %, about 0.10 wt. % to about 0.40 wt. %, about 0.10 wt. % to about 0.35 wt. %, about 0.10 wt. % to about 0.30 wt. %, about 0.10 wt. % to about 0.25 wt. %, about 0.10 wt. % to about 0.20 wt. %, or about 0.10 wt. % to about 0.15 wt. % of a polymerization product of urea-aldehyde adducts.

In some embodiments, the composite material comprises about 0.0001 wt. % to about 0.02 wt. % of cross-linked endotoxin. This includes about 0.0001 wt. %, about 0.0002 wt. %, about 0.0003 wt. %, about 0.0004 wt. %, about 0.0005 wt. %, about 0.0006 wt. %, about 0.0007 wt. %, about 0.0008 wt. %, about 0.0009 wt. %, about 0.001 wt. %, about 0.002 wt. %, about 0.003 wt. %, about 0.004 wt. %, about 0.005 wt. %, about 0.006 wt. %, about 0.007 wt. %, about 0.008 wt. %, about 0.009 wt. %, about 0.01 wt. %, or about 0.02 wt. %, including increments therein, of cross-linked endotoxin.

In some embodiments, the composite material comprises about 0.0003 wt. % to about 0.02 wt. %, about 0.0005 wt. % to about 0.02 wt. %, about 0.0007 wt. % to about 0.02 wt. %, about 0.001 wt. % to about 0.02 wt. %, about 0.003 wt. % to about 0.02 wt. %, about 0.005 wt. % to about 0.02 wt. %, about 0.007 wt. % to about 0.02 wt. %, about 0.01 wt. % to about 0.02 wt. %, about 0.0001 wt. % to about 0.01 wt. %, 0.0003 wt. % to about 0.01 wt. %, about 0.0005 wt. % to about 0.01 wt. %, about 0.0007 wt. % to about 0.01 wt. %, about 0.001 wt. % to about 0.01 wt. %, about 0.003 wt. % to about 0.01 wt. %, about 0.005 wt. % to about 0.01 wt. %, about 0.007 wt. % to about 0.01 wt. %, 0.0001 wt. % to about 0.001 wt. %, 0.0003 wt. % to about 0.001 wt. %, about 0.0005 wt. % to about 0.001 wt. %, or about 0.0007 wt. % to about 0.001 wt. % of cross-linked endotoxin.

The composite material disclosed herein comprises less than about 5,000 ng, about 4,000 ng, about 3,000 ng, about 2,000 ng, about 1,000 ng, or about 500 ng of water-soluble endotoxin per gram of composite material. This includes less than about 4750, 4500, 4250, 4000, 3750, 3500, 3250, 3000, 2750, 2500, 2250, 2000, 1900, 1800, 1700, 1600, 1500, 1400, 1300, 1200, 1100, 1000, 950, 900, 850, 800, 750, 700, 650, 600, 550, 500, 450, 400, 350, 300, 250, 200, 150, 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 ng, including increments therein, of water-soluble endotoxin per gram of composite material.

In some embodiments, the composite material comprises no more than 500 ng of water-soluble endotoxin per gram of composite material. This includes about 500, 450, 400, 350, 300, 250, 200, 150, 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 ng, including increments therein, of water-soluble endotoxin per gram of composite material. In contrast, in the absence of any treatment with multifunctional aldehyde, a comparative composite material can contain more than about 70,000 ng of water-soluble endotoxin per gram of composite material.

In some embodiments, the composite material further comprises a biocide. The biocide is a persistent biocide, e.g., able to withstand high temperatures (e.g., 250° F.-450° F.) used in the preparation of the composite material and inert with respect to other reagents that are used in the preparation of the composition material. Non-limiting examples of a biocide include boric acid, zinc borate, calcium borate, disodium octaborate tetrahydrate, elemental copper, elemental chromium, elemental arsenic, elemental silver, propiconazole, oxidizing agents (e.g., hydrogen peroxide and peracetic acid), phenols and halogenated phenols (e.g., cresol, dichlorophen, and triclosan), quaternary ammonium compounds (QACs) (e.g., centrimide, benzalkonium chloride, and cetylpyridinium chloride), and brominated aliphatic compounds (e.g., 2,2-dibromo-3-nitrilopropionamide (DBNPA), sold as DOWICIL™ QK-20).

In some embodiments, the biocide is present in the composite material in an amount of about 0.01 wt. % to about 2.0 wt. %. This includes about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.10 wt. %, about 0.15 wt. %, about 0.20 wt. %, about 0.25 wt. %, about 0.30 wt. %, about 0.35 wt. %, about 0.40 wt. %, about 0.45 wt. %, about 0.50 wt. %, about 0.55 wt. %, about 0.60 wt. %, about 0.65 wt. %, about 0.70 wt. %, about 0.75 wt. %, about 0.80 wt. %, about 0.85 wt. %, about 0.90 wt. %, about 0.95 wt. %, about 1.0 wt. %, about 1.05 wt. %, about 1.1 wt. %, about 1.15 wt. %, about 1.2 wt. %, about 1.25 wt. %, about 1.3 wt. %, about 1.35 wt. %, about 1.4 wt. %, about 1.45 wt. %, about 1.5 wt. %, about 1.55 wt. %, about 1.6 wt. %, about 1.65 wt. %, about 1.7 wt. %, about 1.75 wt. %, about 1.8 wt. %, about 1.85 wt. %, about 1.9 wt. %, about 1.95 wt. %, or about 2.0 wt. %, including increments therein.

In some embodiments, the biocide is present in the composite material in an amount of about 0.05 wt. % to about 2.0 wt. %, about 0.1 wt. % to about 2.0 wt. %, about 0.25 wt. % to about 2.0 wt. %, about 0.5 wt. % to about 2.0 wt. %, about 0.75 wt. % to about 2.0 wt. %, about 1.0 wt. % to about 2.0 wt. %, about 1.25 wt. % to about 2.0 wt. %, about 1.5 wt. % to about 2.0 wt. %, about 1.75 wt. % to about 2.0 wt. %, about 0.01 wt. % to about 1.8 wt. %, about 0.05 wt. % to about 1.8 wt. %, about 0.1 wt. % to about 1.8 wt. %, about 0.25 wt. % to about 1.8 wt. %, about 0.5 wt. % to about 1.8 wt. %, about 0.75 wt. % to about 1.8 wt. %, about 1.0 wt. % to about 1.8 wt. %, about 1.25 wt. % to about 1.8 wt. %, about 1.5 wt. % to about 1.8 wt. %, about 0.01 wt. % to about 1.6 wt. %, about 0.05 wt. % to about 1.6 wt. %, about 0.1 wt. % to about 1.6 wt. %, about 0.25 wt. % to about 1.6 wt. %, about 0.5 wt. % to about 1.6 wt. %, about 0.75 wt. % to about 1.6 wt. %, about 1.0 wt. % to about 1.6 wt. %, about 1.25 wt. % to about 1.6 wt. %, about 1.4 wt. % to about 1.6 wt. %, about 0.01 wt. % to about 1.3 wt. %, about 0.05 wt. % to about 1.3 wt. %, about 0.1 wt. % to about 1.3 wt. %, about 0.25 wt. % to about 1.3 wt. %, about 0.5 wt. % to about 1.3 wt. %, about 0.75 wt. % to about 1.3 wt. %, about 1.0 wt. % to about 1.3 wt. %, about 0.01 wt. % to about 1.0 wt. %, about 0.05 wt. % to about 1.0 wt. %, about 0.1 wt. % to about 1.0 wt. %, about 0.25 wt. % to about 1.0 wt. %, about 0.5 wt. % to about 1.0 wt. %, about 0.75 wt. % to about 1.0 wt. %, about 0.01 wt. % to about 0.75 wt. %, about 0.05 wt. % to about 0.75 wt. %, about 0.1 wt. % to about 0.75 wt. %, about 0.25 wt. % to about 0.75 wt. %, about 0.5 wt. % to about 0.75 wt. %, about 0.01 wt. % to about 0.50 wt. %, about 0.05 wt. % to about 0.50 wt. %, about 0.1 wt. % to about 0.50 wt. %, about 0.25 wt. % to about 0.50 wt. %, about 0.01 wt. % to about 0.25 wt. %, about 0.05 wt. % to about 0.25 wt. %, or about 0.1 wt. % to about 0.25 wt. %.

In some embodiments, the composite material further comprises an insecticide. Non-limiting examples of an insecticide include permethrin, deltamethrin, or other pyrethroid esters.

In some embodiments, the insecticide is present in the composite material in an amount of about 0.01 wt. % to about 2.0 wt. %. This includes about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.10 wt. %, about 0.15 wt. %, about 0.20 wt. %, about 0.25 wt. %, about 0.30 wt. %, about 0.35 wt. %, about 0.40 wt. %, about 0.45 wt. %, about 0.50 wt. %, about 0.55 wt. %, about 0.60 wt. %, about 0.65 wt. %, about 0.70 wt. %, about 0.75 wt. %, about 0.80 wt. %, about 0.85 wt. %, about 0.90 wt. %, about 0.95 wt. %, about 1.0 wt. %, about 1.05 wt. %, about 1.1 wt. %, about 1.15 wt. %, about 1.2 wt. %, about 1.25 wt. %, about 1.3 wt. %, about 1.35 wt. %, about 1.4 wt. %, about 1.45 wt. %, about 1.5 wt. %, about 1.55 wt. %, about 1.6 wt. %, about 1.65 wt. %, about 1.7 wt. %, about 1.75 wt. %, about 1.8 wt. %, about 1.85 wt. %, about 1.9 wt. %, about 1.95 wt. %, or about 2.0 wt. %, including increments therein.

In some embodiments, the insecticide is present in the composite material in an amount of about 0.05 wt. % to about 2.0 wt. %, about 0.1 wt. % to about 2.0 wt. %, about 0.25 wt. % to about 2.0 wt. %, about 0.5 wt. % to about 2.0 wt. %, about 0.75 wt. % to about 2.0 wt. %, about 1.0 wt. % to about 2.0 wt. %, about 1.25 wt. % to about 2.0 wt. %, about 1.5 wt. % to about 2.0 wt. %, about 1.75 wt. % to about 2.0 wt. %, about 0.01 wt. % to about 1.8 wt. %, about 0.05 wt. % to about 1.8 wt. %, about 0.1 wt. % to about 1.8 wt. %, about 0.25 wt. % to about 1.8 wt. %, about 0.5 wt. % to about 1.8 wt. %, about 0.75 wt. % to about 1.8 wt. %, about 1.0 wt. % to about 1.8 wt. %, about 1.25 wt. % to about 1.8 wt. %, about 1.5 wt. % to about 1.8 wt. %, about 0.01 wt. % to about 1.6 wt. %, about 0.05 wt. % to about 1.6 wt. %, about 0.1 wt. % to about 1.6 wt. %, about 0.25 wt. % to about 1.6 wt. %, about 0.5 wt. % to about 1.6 wt. %, about 0.75 wt. % to about 1.6 wt. %, about 1.0 wt. % to about 1.6 wt. %, about 1.25 wt. % to about 1.6 wt. %, about 1.4 wt. % to about 1.6 wt. %, about 0.01 wt. % to about 1.3 wt. %, about 0.05 wt. % to about 1.3 wt. %, about 0.1 wt. % to about 1.3 wt. %, about 0.25 wt. % to about 1.3 wt. %, about 0.5 wt. % to about 1.3 wt. %, about 0.75 wt. % to about 1.3 wt. %, about 1.0 wt. % to about 1.3 wt. %, about 0.01 wt. % to about 1.0 wt. %, about 0.05 wt. % to about 1.0 wt. %, about 0.1 wt. % to about 1.0 wt. %, about 0.25 wt. % to about 1.0 wt.

%, about 0.5 wt. % to about 1.0 wt. %, about 0.75 wt. % to about 1.0 wt. %, about 0.01 wt. % to about 0.75 wt. %, about 0.05 wt. % to about 0.75 wt. %, about 0.1 wt. % to about 0.75 wt. %, about 0.25 wt. % to about 0.75 wt. %, about 0.5 wt. % to about 0.75 wt. %, about 0.01 wt. % to about 0.50 wt. %, about 0.05 wt. % to about 0.50 wt. %, about 0.1 wt. % to about 0.50 wt. %, about 0.25 wt. % to about 0.50 wt. %, about 0.01 wt. % to about 0.25 wt. %, about 0.05 wt. % to about 0.25 wt. %, or about 0.1 wt. % to about 0.25 wt. %.

In some embodiments, the composite material further comprises an odor blocker. Non-limiting examples of an odor blocker include activated carbon, sodium bicarbonate, zeolite, and iodine (e.g., iodine-based formulation sold as CUPRIDYNE® by Odor No More, Inc.)

In some embodiments, the odor blocker is present in the composite material in an amount of about 0.01 wt. % to about 2.0 wt. %. This includes about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.10 wt. %, about 0.15 wt. %, about 0.20 wt. %, about 0.25 wt. %, about 0.30 wt. %, about 0.35 wt. %, about 0.40 wt. %, about 0.45 wt. %, about 0.50 wt. %, about 0.55 wt. %, about 0.60 wt. %, about 0.65 wt. %, about 0.70 wt. %, about 0.75 wt. %, about 0.80 wt. %, about 0.85 wt. %, about 0.90 wt. %, about 0.95 wt. %, about 1.0 wt. %, about 1.05 wt. %, about 1.1 wt. %, about 1.15 wt. %, about 1.2 wt. %, about 1.25 wt. %, about 1.3 wt. %, about 1.35 wt. %, about 1.4 wt. %, about 1.45 wt. %, about 1.5 wt. %, about 1.55 wt. %, about 1.6 wt. %, about 1.65 wt. %, about 1.7 wt. %, about 1.75 wt. %, about 1.8 wt. %, about 1.85 wt. %, about 1.9 wt. %, about 1.95 wt. %, or about 2.0 wt. %, including increments therein.

In some embodiments, the odor blocker is present in the composite material in an amount of about 0.05 wt. % to about 2.0 wt. %, about 0.1 wt. % to about 2.0 wt. %, about 0.25 wt. % to about 2.0 wt. %, about 0.5 wt. % to about 2.0 wt. %, about 0.75 wt. % to about 2.0 wt. %, about 1.0 wt. % to about 2.0 wt. %, about 1.25 wt. % to about 2.0 wt. %, about 1.5 wt. % to about 2.0 wt. %, about 1.75 wt. % to about 2.0 wt. %, about 0.01 wt. % to about 1.8 wt. %, about 0.05 wt. % to about 1.8 wt. %, about 0.1 wt. % to about 1.8 wt. %, about 0.25 wt. % to about 1.8 wt. %, about 0.5 wt. % to about 1.8 wt. %, about 0.75 wt. % to about 1.8 wt. %, about 1.0 wt. % to about 1.8 wt. %, about 1.25 wt. % to about 1.8 wt. %, about 1.5 wt. % to about 1.8 wt. %, about 0.01 wt. % to about 1.6 wt. %, about 0.05 wt. % to about 1.6 wt. %, about 0.1 wt. % to about 1.6 wt. %, about 0.25 wt. % to about 1.6 wt. %, about 0.5 wt. % to about 1.6 wt. %, about 0.75 wt. % to about 1.6 wt. %, about 1.0 wt. % to about 1.6 wt. %, about 1.25 wt. % to about 1.6 wt. %, about 1.4 wt. % to about 1.6 wt. %, about 0.01 wt. % to about 1.3 wt. %, about 0.05 wt. % to about 1.3 wt. %, about 0.1 wt. % to about 1.3 wt. %, about 0.25 wt. % to about 1.3 wt. %, about 0.5 wt. % to about 1.3 wt. %, about 0.75 wt. % to about 1.3 wt. %, about 1.0 wt. % to about 1.3 wt. %, about 0.01 wt. % to about 1.0 wt. %, about 0.05 wt. % to about 1.0 wt. %, about 0.1 wt. % to about 1.0 wt. %, about 0.25 wt. % to about 1.0 wt. %, about 0.5 wt. % to about 1.0 wt. %, about 0.75 wt. % to about 1.0 wt. %, about 0.01 wt. % to about 0.75 wt. %, about 0.05 wt. % to about 0.75 wt. %, about 0.1 wt. % to about 0.75 wt. %, about 0.25 wt. % to about 0.75 wt. %, about 0.5 wt. % to about 0.75 wt. %, about 0.01 wt. % to about 0.50 wt. %, about 0.05 wt. % to about 0.50 wt. %, about 0.1 wt. % to about 0.50 wt. %, about 0.25 wt. % to about 0.50 wt. %, about 0.01 wt. % to about 0.25 wt. %, about 0.05 wt. % to about 0.25 wt. %, or about 0.1 wt. % to about 0.25 wt. %.

In another aspect, provided herein is a composite material comprising about 70 wt. % to about 99 wt. % of thermally consolidated recovered paper and plastic fragments, about 0.01 wt. % to about 0.40 wt. % of a polymerization product of multifunctional aldehyde, about 0.0001 wt. % to about 0.02 wt. % of cross-linked endotoxin, and about 0.01 wt. % to about 2.0 wt. % of a biocide.

In another aspect, provided herein is a composite material comprising about 70 wt. % to about 99 wt. % of thermally consolidated recovered paper and plastic fragments, about 0.01 wt. % to about 0.40 wt. % of a polymerization product of multifunctional aldehyde, about 0.0001 wt. % to about 0.02 wt. % of cross-linked endotoxin, and about 0.01 wt. % to about 2.0 wt. % of an odor blocker.

In another aspect, provided herein is a composite material comprising about 70 wt. % to about 99 wt. % of thermally consolidated recovered paper and plastic fragments, about 0.01 wt. % to about 0.40 wt. % of a polymerization product of multifunctional aldehyde, about 0.0001 wt. % to about 0.02 wt. % of cross-linked endotoxin, about 0.01 wt. % to about 2.0 wt. % of a biocide, and about 0.01 wt. % to about 2.0 wt. % of an odor blocker.

In another aspect, provided herein is a composite material comprising about 90 wt. % to about 99 wt. % of thermally consolidated recovered paper and plastic fragments, about 0.01 wt. % to about 0.40 wt. % of a polymerization product of multifunctional aldehyde, and about 0.0001 wt. % to about 0.02 wt. % of cross-linked endotoxin.

In another aspect, provided herein is a composite material comprising about 90 wt. % to about 99 wt. % of thermally consolidated recovered paper and plastic fragments, about 0.01 wt. % to about 0.40 wt. % of a polymerization product of multifunctional aldehyde, about 0.0001 wt. % to about 0.02 wt. % of cross-linked endotoxin, and about 0.01 wt. % to about 2.0 wt. % of a biocide.

In another aspect, provided herein is a composite material comprising about 90 wt. % to about 99 wt. % of thermally consolidated recovered paper and plastic fragments, about 0.01 wt. % to about 0.40 wt. % of a polymerization product of multifunctional aldehyde, about 0.0001 wt. % to about 0.02 wt. % of cross-linked endotoxin, and about 0.01 wt. % to about 2.0 wt. % of an odor blocker.

In another aspect, provided herein is a composite material comprising about 90 wt. % to about 99 wt. % of thermally consolidated recovered paper and plastic fragments, about 0.01 wt. % to about 0.40 wt. % of a polymerization product of multifunctional aldehyde, about 0.0001 wt. % to about 0.02 wt. % of cross-linked endotoxin, about 0.01 wt. % to about 2.0 wt. % of a biocide, and about 0.01 wt. % to about 2.0 wt. % of an odor blocker.

In another aspect, provided herein are composite materials prepared according to any method disclosed herein.

Methods to Prepare a Composite Material

In another aspect, provided herein is a method to prepare a composite material, the method comprising:

compressing and heating a mixture comprising paper fragments or plastic fragments, or a combination thereof, and a multifunctional aldehyde to form the composite material;

wherein the composite material comprises polymerization product of the multifunctional aldehyde;

cross-linked endotoxin; and at least about 70 wt. % of the paper fragments or the plastic fragments, or the combination thereof.

In some embodiments, the method further comprises forming the mixture into a mat prior to compressing and heating the mixture. In some embodiments, the method further comprises treating an initial mixture comprising the paper fragments or the plastic fragments, or the combination thereof, with the multifunctional aldehyde. In some embodiments, the method further comprises conditioning the initial mixture at about standard pressure for at least 5 minutes after treating the initial mixture with the multifunctional aldehyde but prior to compressing and heating to form the composite material. In some embodiments, the method further comprises sorting recovered waste materials to obtain the initial mixture; wherein the paper fragments or the plastic fragments, or the combination thereof, comprise gram-negative bacteria.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a multifunctional aldehyde to obtain a treated mixture; and compressing the treated mixture to form the composite material.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a multifunctional aldehyde to obtain a treated mixture; and compressing the treated mixture to form the composite material;

wherein the composite material comprises at least about 70 wt. % of the paper fragments or the plastic fragments, or the combination thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a multifunctional aldehyde to obtain a treated mixture; and compressing the treated mixture to form the composite material;

wherein the composite material polymerization product of the multifunctional aldehyde; cross-linked endotoxin; and at least about 70 wt. % of the paper fragments or the plastic fragments, or the combination thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a urea-aldehyde adduct to obtain a treated mixture; and compressing the treated mixture to form the composite material;

wherein the composite material comprises polymerization product of the urea-aldehyde adduct; cross-linked endotoxin; and at least about 70 wt. % of the paper fragments or the plastic fragments, or the combination thereof.

The recovered waste materials originate from one or more waste streams including municipal solid waste, materials recycling facility residuals, post-commercial waste, and construction and demolition waste. The recovered waste materials comprise about 70 wt. % to about 99 wt. % of paper fragments or plastic fragments, or a combination thereof. This includes about 70 wt. %, about 71 wt. %, about 72 wt. %, about 73 wt. %, about 74 wt. %, about 75 wt. %, about 76 wt. %, about 77 wt. %, about 78 wt. %, about 79 wt. %, about 80 wt. %, about 81 wt. %, about 82 wt. %, about 83 wt. %, about 84 wt. %, about 85 wt. %, about 86 wt. %, about 87 wt. %, about 88 wt. %, about 89 wt. %, about 90 wt. %, about 91 wt. %, about 92 wt. %, about 93 wt. %, about 94 wt. %, about 95 wt. %, about 96 wt. %, about 97 wt. %, about 98 wt. %, or about 99 wt. %, including increments therein, of paper fragments or plastic fragments, or a combination thereof.

In some embodiments, the recovered waste materials comprise about 75 wt. % to about 99 wt. %, about 80 wt. % to about 99 wt. %, about 85 wt. % to about 99 wt. %, about 90 wt. % to about 99 wt. %, about 95 wt. % to about 99 wt. %, about 70 wt. % to about 98 wt. %, about 75 wt. % to about 98 wt. %, about 80 wt. % to about 98 wt. %, about 85 wt. % to about 98 wt. %, about 90 wt. % to about 98 wt. %, about 95 wt. % to about 98 wt. %, about 70 wt. % to about 97 wt. %, about 75 wt. % to about 97 wt. %, about 80 wt. % to about 97 wt. %, about 85 wt. % to about 97 wt. %, about 90 wt. % to about 97 wt. %, about 95 wt. % to about 97 wt. %, about 70 wt. % to about 96 wt. %, about 75 wt. % to about 96 wt. %, about 80 wt. % to about 96 wt. %, about 85 wt. % to about 96 wt. %, about 90 wt. % to about 96 wt. %, or about 95 wt. % to about 96 wt. % of paper fragments or plastic fragments, or a combination thereof.

In some embodiments, the paper fragments or the plastic fragments, or the combination thereof of the initial mixture further comprises one or more fungi.

In some embodiments, the initial mixture is treated with the multifunctional aldehyde or the urea-aldehyde adduct in an amount of about 200 ppm to about 4,000 ppm. This includes multifunctional aldehyde or urea-aldehyde adduct in an amount of about 200, about 225, about 250, about 275, about 300, about 325, about 350, about 375, about 400, about 425, about 450, about 475, about 500, about 525, about 550, about 575, about 600, about 625, about 650, about 675, about 700, about 725, about 750, about 775, about 800, about 825, about 850, about 875, about 900, about 925, about 950, about 975, about 1000, about 1050, about 1100, about 1150, about 1200, about 1250, about 1300, about 1350, about 1400, about 1450, about 1500, about 1550, about 1600, about 1650, about 1700, about 1750, about 1800, about 1850, about 1900, about 1950, about 2000, about 2050, about 2100, about 2150, about 2200, about 2250, about 2300, about 2350, about 2400, about 2450, about 2500, about 2550, about 2600, about 2650, about 2700, about 2750, about 2800, about 2850, about 2900, about 2950, about 3000, about 3050, about 3100, about 3150, about 3200, about 3250, about 3300, about 3350, about 3400, about 3450, about 3500, about 3550, about 3600, about 3650, about 3700, about 3750, about 3800, about 3850, about 3900, about 3950, or about 4000 ppm.

In some embodiments, the initial mixture is treated with the multifunctional aldehyde or the urea-aldehyde adduct in an amount of about 200 ppm to about 4000 ppm, about 500 ppm to about 4000 ppm, about 1000 ppm to about 4000 ppm, about 1500 ppm to about 4000 ppm, about 2000 ppm to about 4000 ppm, about 2500 ppm to about 4000 ppm, about 3000 ppm to about 4000 ppm, about 3500 ppm to about 4000 ppm, about 200 ppm to about 3500 ppm, about 500 ppm to about 3500 ppm, about 1000 ppm to about 3500 ppm, about 1500 ppm to about 3500 ppm, about 2000 ppm to about 3500 ppm, about 2500 ppm to about 3500 ppm, about 3000 ppm to about 3500 ppm, about 200 ppm to about 3000 ppm, about 500 ppm to about 3000 ppm, about 1000 ppm to about 3000 ppm, about 1500 ppm to about 3000 ppm, about 2000 ppm to about 3000 ppm, about 2500 ppm to about 3000 ppm, about 200 ppm to about 2500 ppm, about 500 ppm to about 2500 ppm, about 1000 ppm to about 2500 ppm, about 1500 ppm to about 2500 ppm, about 2000 ppm to about 2500 ppm, about 200 ppm to about 2000 ppm, about 500 ppm to about 2000 ppm, about 1000 ppm to about 2000 ppm, about 1500 ppm to about 2000 ppm, about 200 ppm to about 1500 ppm, about 500 ppm to about 1500 ppm, about 1000 ppm to about 1500 ppm, about 200 ppm to about 1000 ppm, or about 500 ppm to about 1000 ppm.

In some embodiments, the multifunctional aldehyde is applied to the initial mixture as a neat solid or neat liquid, without dissolution or dilution. In some embodiments, the multifunctional aldehyde is applied to the initial mixture as a pre-formed solution of the multifunctional aldehyde. In some embodiments, the multifunctional aldehyde is dissolved in water or an organic solvent, or a combination thereof to prepare the solution.

In some embodiments, the multifunctional aldehyde is at least partially in the form of a urea-aldehyde adduct. In some embodiments, the urea-aldehyde adduct has a molar ratio of urea to multifunctional aldehyde of less than about 1.

In some embodiments, the multifunctional aldehyde is applied to the initial mixture as a pre-formed solution of the urea-aldehyde adduct. In some embodiments, the urea-aldehyde adduct is dissolved in water or an organic solvent, or a combination thereof to prepare the solution.

In some embodiments, the method further comprises treating the initial mixture with urea concomitantly with the multifunctional aldehyde.

In some embodiments, the method further comprises treating the initial mixture with an odor blocker, a biocide, an insecticide, or a combination of two or more thereof. Non-limiting examples of an odor blocker, a biocide, and an insecticide are described herein.

In some embodiments, the method further comprises treating the treated mixture with an odor blocker, a biocide, an insecticide, or a combination of two or more thereof. Non-limiting examples of an odor blocker, a biocide, and an insecticide are described herein.

In some embodiments, the method further comprises conditioning the treated mixture at about standard pressure for at least 5 minutes prior to compressing to form the composite material. In some embodiments, the method further comprises conditioning the treated mixture at about standard pressure for at least 5 minutes prior to compressing and heating to form the composite material. This includes conditioning the treated mixture for about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, or more, minutes.

In some embodiments, the method further comprises conditioning the treated mixture at about standard pressure for at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 minutes.

In some embodiments, the conditioning is performed at a temperature of about 50° F. to about 90° F. This includes a temperature of about 55° F. to about 90° F., about 60° F. to about 90° F., about 65° F. to about 90° F., about 70° F. to about 90° F., about 75° F. to about 90° F., about 80° F. to about 90° F., about 85° F. to about 90° F., about 50° F. to about 85° F., about 55° F. to about 85° F., about 60° F. to about 85° F., about 65° F. to about 85° F., about 70° F. to about 85° F., about 75° F. to about 85° F., about 80° F. to about 85° F., about 50° F. to about 80° F., about 55° F. to about 80° F., about 60° F. to about 80° F., about 65° F. to about 80° F., about 70° F. to about 80° F., about 75° F. to about 80° F., about 50° F. to about 75° F., about 55° F. to about 75° F., about 60° F. to about 75° F., about 65° F. to about 75° F., about 70° F. to about 75° F., about 50° F. to about 70° F., about 55° F. to about 70° F., about 60° F. to about 70° F., or about 65° F. to about 70° F. In some embodiments, the conditioning is performed at a temperature of about 50, 51, 52, 53, 54, 55, 56, 57, 58, 59, 60, 61, 62, 63, 64, 64, 65, 66, 67, 68, 69, 70, 71, 72, 73, 74, 75, 76, 77, 78, 79, 80, 81, 82, 83, 84, 85, 86, 87, 88, 89, or 90° F., including increments therein. In some embodiments, the conditioning is performed at room temperature.

In some embodiments, the compressing is conducted at a pressure of about 5 psi to about 70 psi. This includes a pressure of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70, including increments therein, psi.

In some embodiments, the compressing is conducted at a pressure of about 5 psi to about 65 psi, about 5 psi to about 60 psi, about 5 psi to about 55 psi, about 5 psi to about 50 psi, about 5 psi to about 45 psi, about 5 psi to about 40 psi, about 5 psi to about 35 psi, about 5 psi to about 30 psi, about 10 psi to about 70 psi, about 10 psi to about 65 psi, about 10 psi to about 60 psi, about 10 psi to about 55 psi, about 10 psi to about 50 psi, about 10 psi to about 45 psi, about 10 psi to about 40 psi, about 10 psi to about 35 psi, about 10 psi to about 30 psi, about 15 psi to about 70 psi, about 15 psi to about 65 psi, about 15 psi to about 60 psi, about 15 psi to about 55 psi, about 15 psi to about 50 psi, about 15 psi to about 45 psi, about 15 psi to about 40 psi, about 15 psi to about 35 psi, about 15 psi to about 30 psi, about 20 psi to about 70 psi, about 20 psi to about 65 psi, about 20 psi to about 60 psi, about 20 psi to about 55 psi, about 20 psi to about 50 psi, about 20 psi to about 45 psi, about 20 psi to about 40 psi, about 20 psi to about 35 psi, or about 20 psi to about 30 psi.

In some embodiments, the compressing is conducted at room temperature.

In some embodiments, the compressing is conducted for at least 1, 2, 3, 4, 5, 6, 7, 8, 9, 10, 11, 12, 13, 14, 15, 16, 17, 18, 19, or 20 minutes, including increments there. In some embodiments, the compressing is conducted for about 1, 2, 3, 4, 5, 6, 7, 8, 9, 10, 11, 12, 13, 14, 15, 16, 17, 18, 19, or 20 minutes, including increments there.

In some embodiments, the compressing further comprises heating. In some embodiments, the compressing and heating are conducted at a temperature of at least 200° F. This includes temperatures of about 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, or 450° F., including increments therein. In some embodiments, the compressing and heating are conducted at a temperature of about 200° F. to about 450° F., about 210° F. to about 450° F., about 220° F. to about 450° F., about 230° F. to about 450° F., about 250° F. to about 450° F., about 260° F. to about 450° F., about 270° F. to about 450° F., about 280° F. to about 450° F., about 290° F. to about 450° F., about 300° F. to about 450° F., about 310° F. to about 450° F., about 320° F. to about 450° F., about 330° F. to about 450° F., about 340° F. to about 450° F., about 350° F. to about 450° F., about 360° F. to about 450° F., about 370° F. to about 450° F., about 380° F. to about 450° F., about 390° F. to about 450° F., about 400° F. to about 450° F., about 200° F. to about 425° F., about 210° F. to about 425° F., about 220° F. to about 425° F., about 230° F. to about 425° F., about 240° F. to about 425° F., about 250° F. to about 425° F., about 260° F. to about 425° F., about 270° F. to about 425° F., about 280° F. to about 425° F., about 290° F. to about 425° F., about 300° F. to about 425° F., about 310° F. to about 425° F., about 320° F. to about 425° F., about 330° F. to about 425° F., about 340° F. to about 425° F., about 350° F. to about 425° F., about 360° F. to about 425° F., about 370° F. to about 425° F., about 380° F. to about 425° F., about 390° F. to about 425° F., about 400° F. to about 425° F., about 200° F. to about 400° F., about 210° F. to about 400° F., about 220° F. to about 400° F., about 230° F. to about 400° F., about 240° F. to about 400° F., about 250° F. to about 400° F., about 260° F. to about 400° F., about 270° F. to about 400° F., about 280° F. to about 400° F., about 290° F. to about 400° F., about 300° F. to about 400° F., about 310° F. to about 400° F., about 320° F. to about 400° F., about 330° F. to about 400° F., about 340° F. to about 400° F., about 350° F. to about 400° F., about 360° F. to about 400° F., about 370° F. to about 400° F., about 380° F. to about 400° F., or about 390° F. to about 400° F.

In some embodiments, the compressing and heating are conducted for at least 1, 2, 3, 4, 5, 6, 7, 8, 9, 10, 11, 12, 13, 14, 15, 16, 17, 18, 19, or 20 minutes, including increments there. In some embodiments, the compressing and heating are conducted for about 1, 2, 3, 4, 5, 6, 7, 8, 9, 10, 11, 12, 13, 14, 15, 16, 17, 18, 19, or 20 minutes, including increments there.

In some embodiments, the method further comprises forming the treated mixture into a mat prior to compressing the treated mixture. In some embodiments, the method further comprises forming the treated mixture into a mat prior to compressing and heating the treated mixture.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a multifunctional aldehyde to obtain a treated mixture; and compressing the treated mixture to form the composite material;

wherein the composite material comprises polymerization product of the multifunctional aldehyde; cross-linked endotoxin; and about 70 wt. % to about 99 wt. % of the paper fragments or the plastic fragments, or the combination thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a multifunctional aldehyde to obtain a treated mixture; and compressing the treated mixture to form the composite material;

wherein the composite material comprises polymerization product of the multifunctional aldehyde; cross-linked endotoxin; about 70 wt. % to about 99 wt. % of the paper fragments or the plastic fragments, or the combination thereof; and no more than 5,000 ng of water-soluble endotoxin per gram of composite material.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a multifunctional aldehyde to obtain a treated mixture; and compressing the treated mixture to form the composite material;

wherein the composite material comprises polymerization product of the multifunctional aldehyde; cross-linked endotoxin; about 70 wt. % to about 99 wt. % of the paper fragments or the plastic fragments, or the combination thereof; and no more than 5,000 ng of water-soluble endotoxin per gram of composite material; and the multifunctional aldehyde is selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating and conditioning the initial mixture with a multifunctional aldehyde to obtain a treated mixture; and compressing the treated mixture to form the composite material;

wherein the composite material comprises polymerization product of the multifunctional aldehyde; cross-linked endotoxin; about 70 wt. % to about 99 wt. % of the paper fragments or the plastic fragments, or the combination thereof; and no more than 5,000 ng of water-soluble endotoxin per gram of composite material; and the multifunctional aldehyde is selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating and conditioning the initial mixture with a multifunctional aldehyde for at least 5 minutes at standard pressure and at a temperature of about 50° F. to about 90° F. to obtain a treated mixture; and compressing the treated mixture to form the composite material;

wherein the composite material comprises polymerization product of the multifunctional aldehyde; cross-linked endotoxin; about 70 wt. % to about 99 wt. % of the paper fragments or the plastic fragments, or the combination thereof; and no more than 5,000 ng of water-soluble endotoxin per gram of composite material; and the multifunctional aldehyde is selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating and conditioning the initial mixture with a multifunctional aldehyde for at least 5 minutes at standard pressure and at a temperature of about 50° F. to about 90° F. to obtain a treated mixture; and compressing and heating the treated mixture to form the composite material;

wherein the composite material comprises polymerization product of the multifunctional aldehyde; cross-linked endotoxin; about 70 wt. % to about 99 wt. % of the paper fragments or the plastic fragments, or the combination thereof; and no more than 5,000 ng of water-soluble endotoxin per gram of composite material; and the multifunctional aldehyde is selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating and conditioning the initial mixture with a multifunctional aldehyde for at least 5 minutes at standard pressure and at a temperature of about 50° F. to about 90° F. to obtain a treated mixture; and compressing and heating the treated mixture for about 1 minute to about 20 minutes at a temperature of about 250° F. to about 450° F. to form the composite material;

wherein the composite material comprises polymerization product of the multifunctional aldehyde; cross-linked endotoxin; about 70 wt. % to about 99 wt. % of the paper fragments or the plastic fragments, or the combination thereof; and no more than 5,000 ng of water-soluble endotoxin per gram of composite material; and the multifunctional aldehyde is selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a urea-aldehyde adduct to obtain a treated mixture; and compressing the treated mixture to form the composite material;

wherein the composite material comprises polymerization product of the urea-aldehyde adduct; cross-linked endotoxin; and about 70 wt. % to about 99 wt. % of the paper fragments or the plastic fragments, or the combination thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a urea-aldehyde adduct to obtain a treated mixture; and compressing the treated mixture to form the composite material;

wherein the composite material comprises polymerization product of the urea-aldehyde adduct; cross-linked endotoxin; about 70 wt. % to about 99 wt. % of the paper fragments or the plastic fragments, or the combination thereof; and no more than 5,000 ng of water-soluble endotoxin per gram of composite material.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a urea-aldehyde adduct to obtain a treated mixture; and compressing the treated mixture to form the composite material;

wherein the composite material comprises polymerization product of the urea-aldehyde adduct; cross-linked endotoxin; about 70 wt. % to about 99 wt. % of the paper fragments or the plastic fragments, or the combination thereof; and no more than 5,000 ng of water-soluble endotoxin per gram of composite material; and the urea-aldehyde adduct comprises a multifunctional aldehyde selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating the initial mixture with a urea-aldehyde adduct to obtain a treated mixture; and compressing the treated mixture to form the composite material;

wherein the composite material comprises polymerization product of the urea-aldehyde adduct; cross-linked endotoxin; about 70 wt. % to about 99 wt. % of the paper fragments or the plastic fragments, or the combination thereof; and no more than 5,000 ng of water-soluble endotoxin per gram of composite material; and the urea-aldehyde adduct comprises a multifunctional aldehyde selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating and conditioning the initial mixture with a urea-aldehyde adduct to obtain a treated mixture; and compressing the treated mixture to form the composite material;

wherein the composite material comprises polymerization product of the urea-aldehyde adduct; cross-linked endotoxin; about 70 wt. % to about 99 wt. % of the paper fragments or the plastic fragments, or the combination thereof; and no more than 5,000 ng of water-soluble endotoxin per gram of composite material; and the urea-aldehyde adduct comprises a multifunctional aldehyde selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating and conditioning the initial mixture with a urea-aldehyde adduct for at least 5 minutes at standard pressure and at a temperature of about 50° F. to about 90° F. to obtain a treated mixture; and compressing the treated mixture to form the composite material;

wherein the composite material comprises polymerization product of the urea-aldehyde adduct; cross-linked endotoxin; about 70 wt. % to about 99 wt. % of the paper fragments or the plastic fragments, or the combination thereof; and no more than 5,000 ng of water-soluble endotoxin per gram of composite material; and the urea-aldehyde adduct comprises a multifunctional aldehyde selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating and conditioning the initial mixture with a urea-aldehyde adduct for at least 5 minutes at standard pressure and at a temperature of about 50° F. to about 90° F. to obtain a treated mixture; and compressing and heating the treated mixture to form the composite material;

wherein the composite material comprises polymerization product of the urea-aldehyde adduct; cross-linked endotoxin; about 70 wt. % to about 99 wt. % of the paper fragments or the plastic fragments, or the combination thereof; and no more than 5,000 ng of water-soluble endotoxin per gram of composite material; and the urea-aldehyde adduct comprises a multifunctional aldehyde selected from the group consisting of malondialdehyde, succinic dialdehyde, glutaraldehyde, phthalaldehyde, or a combination of two or more thereof.

In another aspect, provided herein is a method to prepare a composite material, the method comprising, consisting essentially of, or consisting of:

sorting recovered waste materials to obtain an initial mixture of paper fragments or plastic fragments, or a combination thereof, wherein the paper fragments or the plastic fragments, or the combination thereof comprise gram-negative bacteria;

treating and conditioning the initial mixture with a urea-aldehyde adduct for at least 5 minutes at standard pressure and at a temperature of about 50° F. to about 90° F. to obtain a treated mixture; and compressing and heating the treated mixture for about 1 minute to about 20 minutes at a temperature of about 200° F. to about 450° F. to form the composite material;

wherein the composite material comprises polymerization product of the urea-aldehyde adduct; cross-linked endotoxin; about 70 wt. % to about 99 wt. % of the paper fragments or the plastic fragments, or the combination thereof; and no more than 5,000 ng of water-soluble endotoxin per gram of composite material; and the urea-aldehyde adduct comprises a multifunctional aldehyde selected from the group consisting of malondialdehyde, succinic dialdehyde, glutaraldehyde, phthalaldehyde, or a combination of two or more thereof Methods to Sanitize Recovered Waste Materials In another aspect, provided herein is a method to sanitize recovered waste materials, the method comprising, consisting essentially of, or consisting of:

treating recovered waste materials with a multifunctional aldehyde to obtain a treated mixture, wherein the recovered waste materials comprise gram-negative bacteria; and conditioning the treated mixture at standard pressure for at least 5 minutes to obtain sanitized recovered waste materials.

In some embodiments, the term "sanitize" refers to decreasing the amount of bacteria or fungi, or combination thereof, relative to an amount of bacteria or fungi in untreated materials. In some embodiments, the term "sanitize" refers to decreasing the amount of endotoxin relative to an amount of endotoxin in untreated materials. In some embodiments, the term "sanitize" refers to decreasing the amount of bacteria or fungi, or combination thereof, relative to an amount of bacteria or fungi in untreated materials as well as decreasing the amount of endotoxin relative to an amount of endotoxin in untreated materials.

In another aspect, provided herein is a method to sanitize recovered waste materials, the method comprising, consisting essentially of, or consisting of:
treating recovered waste materials with a multifunctional aldehyde to obtain a treated mixture, wherein the recovered waste materials comprise gram-negative bacteria; and
conditioning the treated mixture at standard pressure for at least 5 minutes to obtain sanitized recovered waste materials;
wherein the sanitized recovered waste materials comprise polymerization product of the multifunctional aldehyde and cross-linked endotoxin.

In another aspect, provided herein is a method to sanitize recovered waste materials, the method comprising, consisting essentially of, or consisting of:
treating recovered waste materials with a multifunctional aldehyde to obtain a treated mixture, wherein the recovered waste materials comprise gram-negative bacteria and about 70 wt. % to about 99 wt. % of paper fragments or plastic fragments, or a combination thereof; and
conditioning the treated mixture at standard pressure for at least 5 minutes to obtain sanitized recovered waste materials;
wherein the sanitized recovered waste materials comprise polymerization product of the multifunctional aldehyde and cross-linked endotoxin.

In another aspect, provided herein is a method to sanitize recovered waste materials, the method comprising, consisting essentially of, or consisting of:
treating recovered waste materials with a multifunctional aldehyde to obtain a treated mixture, wherein the recovered waste materials comprise gram-negative bacteria and about 70 wt. % to about 99 wt. % of paper fragments or plastic fragments, or a combination thereof; and
conditioning the treated mixture at standard pressure for at least 5 minutes to obtain sanitized recovered waste materials;
wherein the sanitized recovered waste materials comprise polymerization product of the multifunctional aldehyde and cross-linked endotoxin; and less than 5,000 ng of water-soluble endotoxin per gram of sanitized recovered waste materials.

In another aspect, provided herein is a method to sanitize recovered waste materials, the method comprising, consisting essentially of, or consisting of:
treating recovered waste materials with a multifunctional aldehyde to obtain a treated mixture, wherein the recovered waste materials comprise gram-negative bacteria and about 70 wt. % to about 99 wt. % of paper fragments or plastic fragments, or a combination thereof; and
conditioning the treated mixture at standard pressure for at least 5 minutes to obtain sanitized recovered waste materials;
wherein the sanitized recovered waste materials comprise polymerization product of the multifunctional aldehyde and cross-linked endotoxin; and less than 5,000 ng of water-soluble endotoxin per gram of sanitized recovered waste materials; and the multifunctional aldehyde is selected from the group consisting of malondialdehyde, succinic dialdehyde, glutaraldehyde, phthalaldehyde, or a combination of two or more thereof.

In another aspect, provided herein is a method to sanitize recovered waste materials, the method comprising, consisting essentially of, or consisting of:
treating recovered waste materials with a urea-aldehyde adduct to obtain a treated mixture, wherein the recovered waste materials comprise gram-negative bacteria; and
conditioning the treated mixture at standard pressure for at least 5 minutes to obtain sanitized recovered waste materials;
wherein the sanitized recovered waste materials comprise polymerization product of the urea-aldehyde adduct and cross-linked endotoxin.

In another aspect, provided herein is a method to sanitize recovered waste materials, the method comprising, consisting essentially of, or consisting of:
treating recovered waste materials with a urea-aldehyde adduct to obtain a treated mixture, wherein the recovered waste materials comprise gram-negative bacteria and about 70 wt. % to about 99 wt. % of paper fragments or plastic fragments, or a combination thereof; and
conditioning the treated mixture at standard pressure for at least 5 minutes to obtain sanitized recovered waste materials;
wherein the sanitized recovered waste materials comprise polymerization product of the urea-aldehyde adduct and cross-linked endotoxin.

In another aspect, provided herein is a method to sanitize recovered waste materials, the method comprising, consisting essentially of, or consisting of:
treating recovered waste materials with a urea-aldehyde adduct to obtain a treated mixture, wherein the recovered waste materials comprise gram-negative bacteria and about 70 wt. % to about 99 wt. % of paper fragments or plastic fragments, or a combination thereof; and
conditioning the treated mixture at standard pressure for at least 5 minutes to obtain sanitized recovered waste materials;
wherein the sanitized recovered waste materials comprise polymerization product of the urea-aldehyde adduct and cross-linked endotoxin; and less than 5,000 ng of water-soluble endotoxin per gram of sanitized recovered waste materials.

In another aspect, provided herein is a method to sanitize recovered waste materials, the method comprising, consisting essentially of, or consisting of:
treating recovered waste materials with a urea-aldehyde adduct to obtain a treated mixture, wherein the recovered waste materials comprise gram-negative bacteria and about 70 wt. % to about 99 wt. % of paper fragments or plastic fragments, or a combination thereof; and
conditioning the treated mixture at standard pressure for at least 5 minutes to obtain sanitized recovered waste materials;
wherein the sanitized recovered waste materials comprise polymerization product of the urea-aldehyde adduct and cross-linked endotoxin; and less than 5,000 ng of water-soluble endotoxin per gram of sanitized recovered waste materials; and the urea-aldehyde adduct comprises a multifunctional aldehyde selected from the group consisting of malondialdehyde, succinic dialdehyde, glutaraldehyde, phthalaldehyde, or a combination of two or more thereof.

The recovered waste materials comprise about 70 wt. % to about 99 wt. % of paper fragments or plastic fragments, or a combination thereof. This includes about 70 wt. %, about 71 wt. %, about 72 wt. %, about 73 wt. %, about 74 wt. %, about 75 wt. %, about 76 wt. %, about 77 wt. %, about 78 wt. %, about 79 wt. %, about 80 wt. %, about 81 wt. %, about 82 wt. %, about 83 wt. %, about 84 wt. %, about 85 wt. %, about 86 wt. %, about 87 wt. %, about 88 wt. %, about 89 wt. %, about 90 wt. %, about 91 wt. %, about 92 wt. %, about 93 wt. %, about 94 wt. %, about 95 wt. %, about 96 wt. %, about 97 wt. %, about 98 wt. %, or about 99 wt. %, including increments therein, of paper fragments or plastic fragments, or a combination thereof.

In some embodiments, the recovered waste materials comprise about 75 wt. % to about 99 wt. %, about 80 wt. % to about 99 wt. %, about 85 wt. % to about 99 wt. %, about 90 wt. % to about 99 wt. %, about 95 wt. % to about 99 wt. %, about 70 wt. % to about 98 wt. %, about 75 wt. % to about 98 wt. %, about 80 wt. % to about 98 wt. %, about 85 wt. % to about 98 wt. %, about 90 wt. % to about 98 wt. %, about 95 wt. % to about 98 wt. %, about 70 wt. % to about 97 wt. %, about 75 wt. % to about 97 wt. %, about 80 wt. % to about 97 wt. %, about 85 wt. % to about 97 wt. %, about 90 wt. % to about 97 wt. %, about 95 wt. % to about 97 wt. %, about 70 wt. % to about 96 wt. %, about 75 wt. % to about 96 wt. %, about 80 wt. % to about 96 wt. %, about 85 wt. % to about 96 wt. %, about 90 wt. % to about 96 wt. %, or about 95 wt. % to about 96 wt. % of paper fragments or plastic fragments, or a combination thereof.

The sanitized recovered waste materials disclosed herein comprise less than about 5,000 ng, about 4,000 ng, about 3,000 ng, about 2,000 ng, about 1,000 ng, or about 500 ng of water-soluble endotoxin per gram of sanitized recovered waste materials. This includes less than about 4750, 4500, 4250, 4000, 3750, 3500, 3250, 3000, 2750, 2500, 2250, 2000, 1900, 1800, 1700, 1600, 1500, 1400, 1300, 1200, 1100, 1000, 950, 900, 850, 800, 750, 700, 650, 600, 550, 500, 450, 400, 350, 300, 250, 200, 150, 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 ng, including increments therein, of water-soluble endotoxin per gram of sanitized recovered waste materials.

In some embodiments, the sanitized recovered waste materials comprise no more than 1,000 ng of water-soluble endotoxin per gram of sanitized recovered waste materials. This includes about 1000, 950, 900, 850, 800, 750, 700, 650, 600, 550, 500, 450, 400, 350, 300, 250, 200, 150, 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 ng, including increments therein, of water-soluble endotoxin per gram of sanitized recovered waste materials. In contrast, in the absence of any treatment with multifunctional aldehyde, comparative recovered waste materials can contain more than about 75,000 ng of water-soluble endotoxin per gram of recovered waste materials.

In some embodiments, the recovered waste materials comprise paper fragments or plastic fragments, or a combination thereof; and the paper fragments or the plastic fragments, or the combination thereof comprise the gram-negative bacteria. In some embodiments, the paper fragments or the plastic fragments, or the combination thereof, further comprises one or more fungi.

In some embodiments, the recovered waste materials are treated with the multifunctional aldehyde or the urea-aldehyde adduct in an amount of about 200 ppm to about 4,000 ppm. This includes multifunctional aldehyde or the urea-aldehyde adduct in an amount of about 200, about 225, about 250, about 275, about 300, about 325, about 350, about 375, about 400, about 425, about 450, about 475, about 500, about 525, about 550, about 575, about 600, about 625, about 650, about 675, about 700, about 725, about 750, about 775, about 800, about 825, about 850, about 875, about 900, about 925, about 950, about 975, about 1000, about 1050, about 1100, about 1150, about 1200, about 1250, about 1300, about 1350, about 1400, about 1450, about 1500, about 1550, about 1600, about 1650, about 1700, about 1750, about 1800, about 1850, about 1900, about 1950, about 2000, about 2050, about 2100, about 2150, about 2200, about 2250, about 2300, about 2350, about 2400, about 2450, about 2500, about 2550, about 2600, about 2650, about 2700, about 2750, about 2800, about 2850, about 2900, about 2950, about 3000, about 3050, about 3100, about 3150, about 3200, about 3250, about 3300, about 3350, about 3400, about 3450, about 3500, about 3550, about 3600, about 3650, about 3700, about 3750, about 3800, about 3850, about 3900, about 3950, or about 4000 ppm.

In some embodiments, the recovered waste materials are treated with the multifunctional aldehyde or the urea-aldehyde adduct in an amount of about 200 ppm to about 4000 ppm, about 500 ppm to about 4000 ppm, about 1000 ppm to about 4000 ppm, about 1500 ppm to about 4000 ppm, about 2000 ppm to about 4000 ppm, about 2500 ppm to about 4000 ppm, about 3000 ppm to about 4000 ppm, about 3500 ppm to about 4000 ppm, about 200 ppm to about 3500 ppm, about 500 ppm to about 3500 ppm, about 1000 ppm to about 3500 ppm, about 1500 ppm to about 3500 ppm, about 2000 ppm to about 3500 ppm, about 2500 ppm to about 3500 ppm, about 3000 ppm to about 3500 ppm, about 200 ppm to about 3000 ppm, about 500 ppm to about 3000 ppm, about 1000 ppm to about 3000 ppm, about 1500 ppm to about 3000 ppm, about 2000 ppm to about 3000 ppm, about 2500 ppm to about 3000 ppm, about 200 ppm to about 2500 ppm, about 500 ppm to about 2500 ppm, about 1000 ppm to about 2500 ppm, about 1500 ppm to about 2500 ppm, about 2000 ppm to about 2500 ppm, about 200 ppm to about 2000 ppm, about 500 ppm to about 2000 ppm, about 1000 ppm to about 2000 ppm, about 1500 ppm to about 2000 ppm, about 200 ppm to about 1500 ppm, about 500 ppm to about 1500 ppm, about 1000 ppm to about 1500 ppm, about 200 ppm to about 1000 ppm, or about 500 ppm to about 1000 ppm.

In some embodiments, the multifunctional aldehyde is selected from the group consisting of glyoxal, malondialdehyde, succinic dialdehyde, glutaraldehyde, phthalaldehyde, or a combination of two or more thereof. In some embodiments, the multifunctional aldehyde is selected from the group consisting of malondialdehyde, succinic dialdehyde, glutaraldehyde, phthalaldehyde, or a combination of two or more thereof. In some embodiments, the multifunctional aldehyde is glyoxal. In some embodiments, the multifunctional aldehyde is not glyoxal. In some embodiments, the multifunctional aldehyde is malondialdehyde. In some embodiments, the multifunctional aldehyde is succinic dialdehyde. In some embodiments, the multifunctional aldehyde is glutaraldehyde. In some embodiments, the multifunctional aldehyde is phthalaldehyde.

In some embodiments, the multifunctional aldehyde is applied to the recovered waste materials as a neat solid or neat liquid, without dissolution or dilution. In some embodiments, the multifunctional aldehyde is applied to the recovered waste materials as a pre-formed solution of the multifunctional aldehyde. In some embodiments, the multifunctional aldehyde is dissolved in water or an organic solvent, or a combination thereof to prepare the solution.

In some embodiments, the multifunctional aldehyde is at least partially in the form of a urea-aldehyde adduct. In some embodiments, the urea-aldehyde adduct has a molar ratio of urea to multifunctional aldehyde of less than about 1.

In some embodiments, the multifunctional aldehyde is applied to the recovered waste materials as a neat solid or neat liquid, without dissolution or dilution. In some embodiments, the multifunctional aldehyde is applied to the recovered waste materials as a pre-formed solution of the urea-aldehyde adduct. In some embodiments, the urea-aldehyde adduct is dissolved in water or an organic solvent, or a combination thereof to prepare the solution.

In some embodiments, the method further comprises treating the recovered waste materials with urea concomitantly with the multifunctional aldehyde.

In some embodiments, the conditioning of the treated mixture at about standard pressure occurs for about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, or more, minutes.

In some embodiments, the conditioning of the treated mixture at about standard pressure occurs for at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 minutes.

In some embodiments, the conditioning is performed at a temperature of about 50° F. to about 90° F. This includes a temperature of about 55° F. to about 90° F., about 60° F. to about 90° F., about 65° F. to about 90° F., about 70° F. to about 90° F., about 75° F. to about 90° F., about 80° F. to about 90° F., about 85° F. to about 90° F., about 50° F. to about 85° F., about 55° F. to about 85° F., about 60° F. to about 85° F., about 65° F. to about 85° F., about 70° F. to about 85° F., about 75° F. to about 85° F., about 80° F. to about 85° F., about 50° F. to about 80° F., about 55° F. to about 80° F., about 60° F. to about 80° F., about 65° F. to about 80° F., about 70° F. to about 80° F., about 75° F. to about 80° F., about 50° F. to about 75° F., about 55° F. to about 75° F., about 60° F. to about 75° F., about 65° F. to about 75° F., about 70° F. to about 75° F., about 50° F. to about 70° F., about 55° F. to about 70° F., about 60° F. to about 70° F., or about 65° F. to about 70° F. In some embodiments, the conditioning is performed at a temperature of about 50, 51, 52, 53, 54, 55, 56, 57, 58, 59, 60, 61, 62, 63, 64, 64, 65, 66, 67, 68, 69, 70, 71, 72, 73, 74, 75, 76, 77, 78, 79, 80, 81, 82, 83, 84, 85, 86, 87, 88, 89, or 90° F., including increments therein. In some embodiments, the conditioning is performed at room temperature.

The present invention, thus generally described, will be understood more readily by reference to the following examples, which are provided by way of illustration and are not intended to be limiting of the present invention.

EXAMPLES

Figure 2:
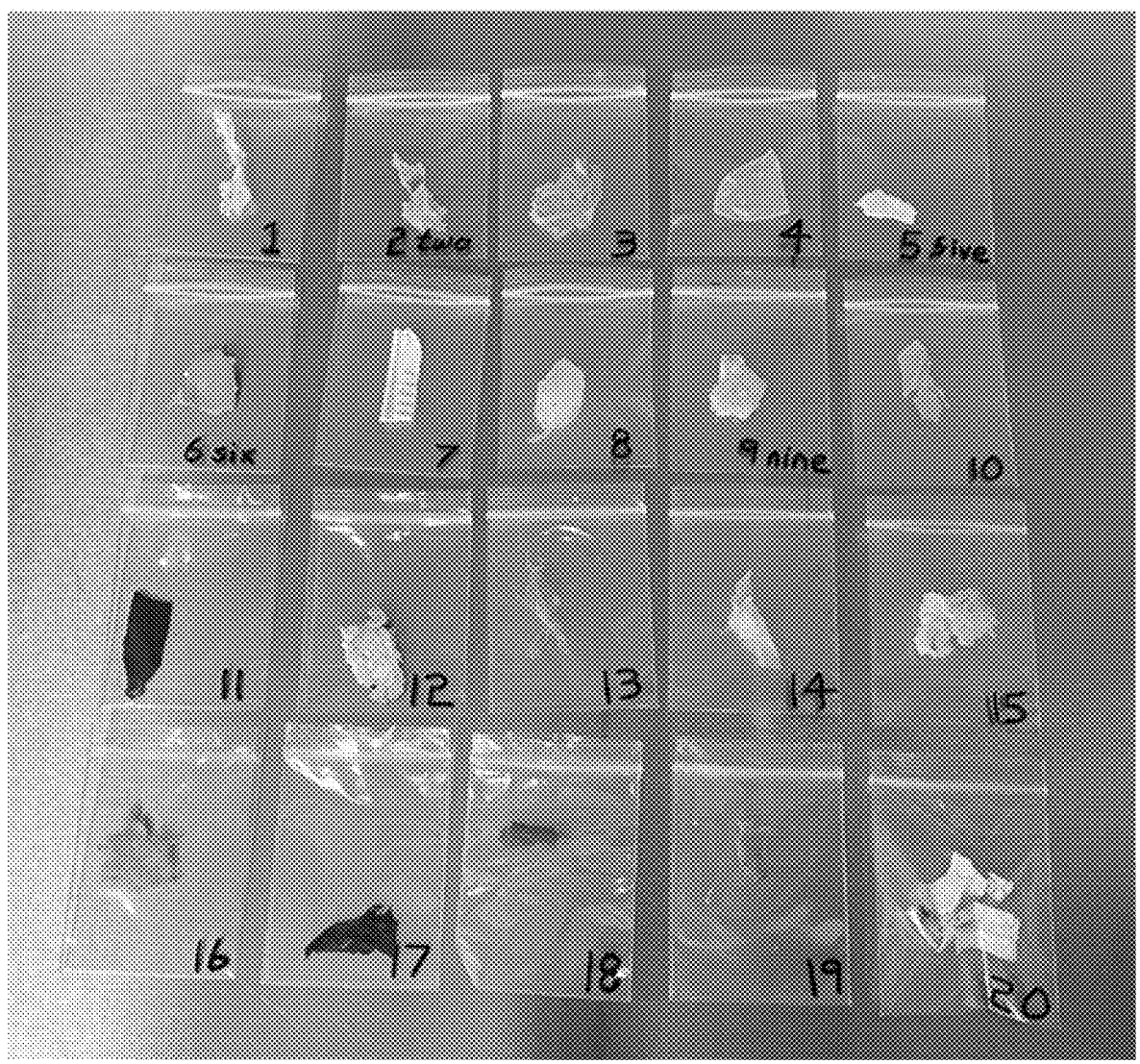
FIG. 2 depicts recovered plastic fragments from an initial mixture of recovered paper and plastic fragments resulting from sorting processes of recovered waste materials.

Example 1: Microbial Activity of Untreated Recovered Paper & Plastic Fragments Multiple recycled materials were collected in trucks from commercial locations. The recycled materials were subjected to a primary sorting process that was operated by a materials recycling facility (MRF). High value items, such as PET bottles, metal cans, cardboard, and certain types of glass were removed in this primary sorting process. The residual portion of this material stream was fed into a secondary sorting process, which included screens, wind sifters, magnets, and NIR-based sorting equipment, which was designed to remove food and other organic particles, glass, metals, black plastic and PET. Multiple refiners were included in the secondary process and these machines reduced the size of the recovered material. The product of this secondary sorting and refining process was a mixture of recovered paper fragments and recovered plastic fragments. The fragments were all small enough to pass a screen with a mesh size of 1". About 50-65% of the mixture was paper and about 35-50% of it was plastic. A majority of the plastic fragments were presumed to be comprised of polyethylene and polypropylene. Other plastic types in this mixture were observed and were presumed to include polystyrene, nylon, polyester, polyvinyl chloride, acrylonitrile-based plastics, rubbery plastics, and other. Multiple batches of this mixture of fragments were collected. The moisture content of these batches ranged from about 8-25 wt. %. See FIGS. 1 and 2.

Portions of each of the collected batches of paper/plastic fragment mixtures were subjected to cell culture tests. Specifically, samples (50-100 mg) were measured for mass and then extracted in phosphate-buffered water (1 mL). Portions of the extract were then used to inoculate cell culture plate media (tryptic soy agar for bacteria and malt extract agar for fungi). The media were incubated for 5-7 days and then stained. Organisms on the media were counted and reported as colony formation units (CFU) per gram of fragment sample. An attempt was made to conduct specific counts for different organism species or groups. Dilutions were used for samples with relatively high microbial activity. Test results are shown in Table 1. Bacteria types detected included gram-negative rods. The results demonstrate that untreated recovered paper/plastic fragments have high levels of both bacterial and fungal activity.

TABLE 1

Cultured Microbe Levels Associated with Untreated Recovered Paper/Plastic Fragments

| SAMPLE | MOISTURE CONTENT (%) | BACTERIA (CFU/g) | FUNGI (CFU/g) |
|---|---|---|---|
| 1 | 8.1 | 5,400,000 | 99,000 |
| 2 | 8.1 | 1,200,000 | 51,000 |
| 3 | 24.8 | 39,000,000 | 37,000,000 |
| 4 | 13.5 | 40,000,000 | 14,000,000 |
| 5 | 17.6 | 17,000,000 | 770,000 |
| 6 | 13.8 | 2,200,000 | 4,000 |
| 7 | 19.6 | 23,000,000 | 880,000 |
| 8 | 12.2 | 65,300,000 | 9,000,000 |
| 9 | N.M. | 34,000,000 | 960,000 |
| 10 | 9.8 | 37,000,000 | 3,700 |
| 11 | 7.2 | 970,000 | 1,700 |
| 12 | 3.0 | 18,000,000 | 2,400 |
| AVERAGE | 13.5 | 23,600,000 | 5,230,000 |

Example 2: Water Soluble Endotoxin Levels in Untreated Recovered Paper & Plastic Fragments Sample #7 from Example 1 was assayed for water-soluble endotoxins. Specifically, a clean, new 500 mL plastic bottle (500 mL capacity) was charged with recovered paper/plastic fragments (20 g, from sample #7 in Example 1) and sterile, cell-culture grade water (200 g). The bottle was immediately capped tightly and agitated in a Gilson shaker for a period of 60 s. The loaded bottle was then conditioned for 1 h at a temperature of 65-70° F. and was then subjected to agitation in the Gilson shaker for a second period of 60 s. The bottle was then opened and a sample of liquor extract (15 mL) was decanted into a sterile sample vial, which was immediately capped and labeled. Collected extract underwent endotoxin analysis using the L.A.L. kinetic chromogenic method. Test results are shown in Table 2. The results demonstrate that untreated recovered paper/plastic fragments contained high levels of water-soluble endotoxin.

TABLE 2

Water-Soluble Endotoxin Level in an Extract Derived from Untreated Recovered Paper/Plastic Fragments

| SAMPLE | ENDOTOXIN CONCENTRATION (ng/mL) |
|---|---|
| 7N | 7,700 |

The results of Example 2 provide a demonstration that the untreated mixture of paper and plastic fragments had a water-soluble endotoxin level of about 77,000 ng per gram of fragments. Specifically, the extract had a volume of 200 mL and a water-soluble endotoxin level of 7,700 ng/mL. Thus, the total amount of water soluble endotoxin in the extract was 1,540,000 ng. This water-soluble endotoxin was derived from 20 g of untreated paper and plastic fragments. Thus, the untreated paper and plastic fragments had a water-soluble endotoxin level of 77,000 ng/g.

Figure 3:
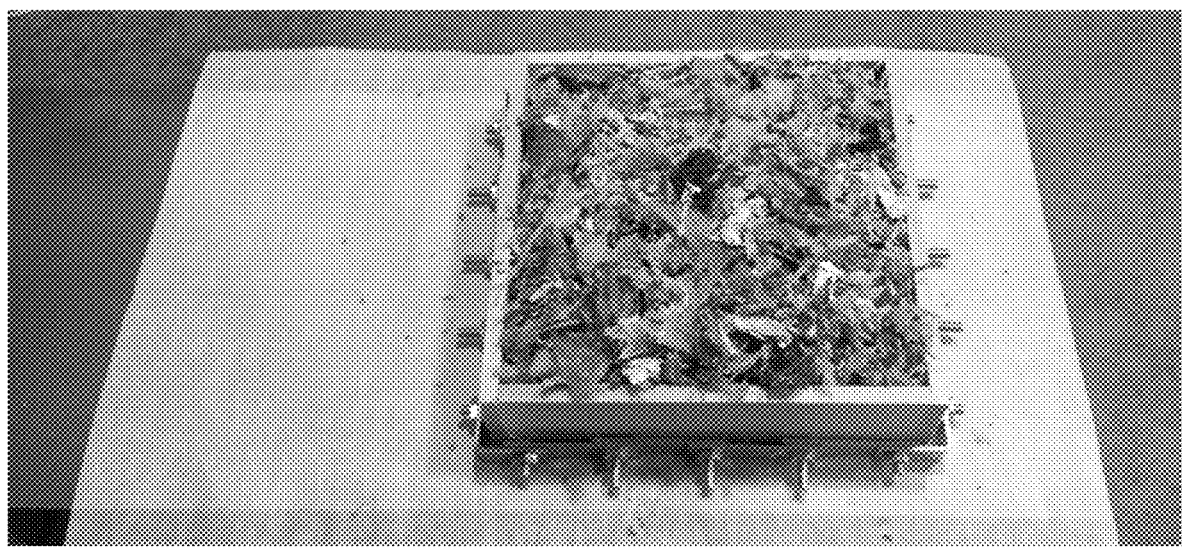
FIG. 3 depicts a non-limiting example of a wooden forming frame loaded with untreated paper/plastic fragments prior to compression.

Example 3: Microbial Activity of a Composite Building Material Derived from Untreated Recovered Paper & Plastic Fragments Samples #9, #10, and #11 from Example 1 were used to make lab-scale composite building material panels. For this process, a sheet of release paper (10.75"×15") was placed on top of one end of a steel caul sheet (1/16"×8"×24"). A metal frame (0.5" high) with dimensions of 6.75"×6.75" was sprayed with release agent and was then placed on top of the release paper. A wooden forming frame (2.0" high) with interior dimensions of 6"×6" was placed on top of the release paper just inside the metal frame. A mixture of recovered paper/plastic fragment (135 g) was loaded uniformly into the wooden forming frame and was then manually compressed. See FIG. 3.

Figure 4:
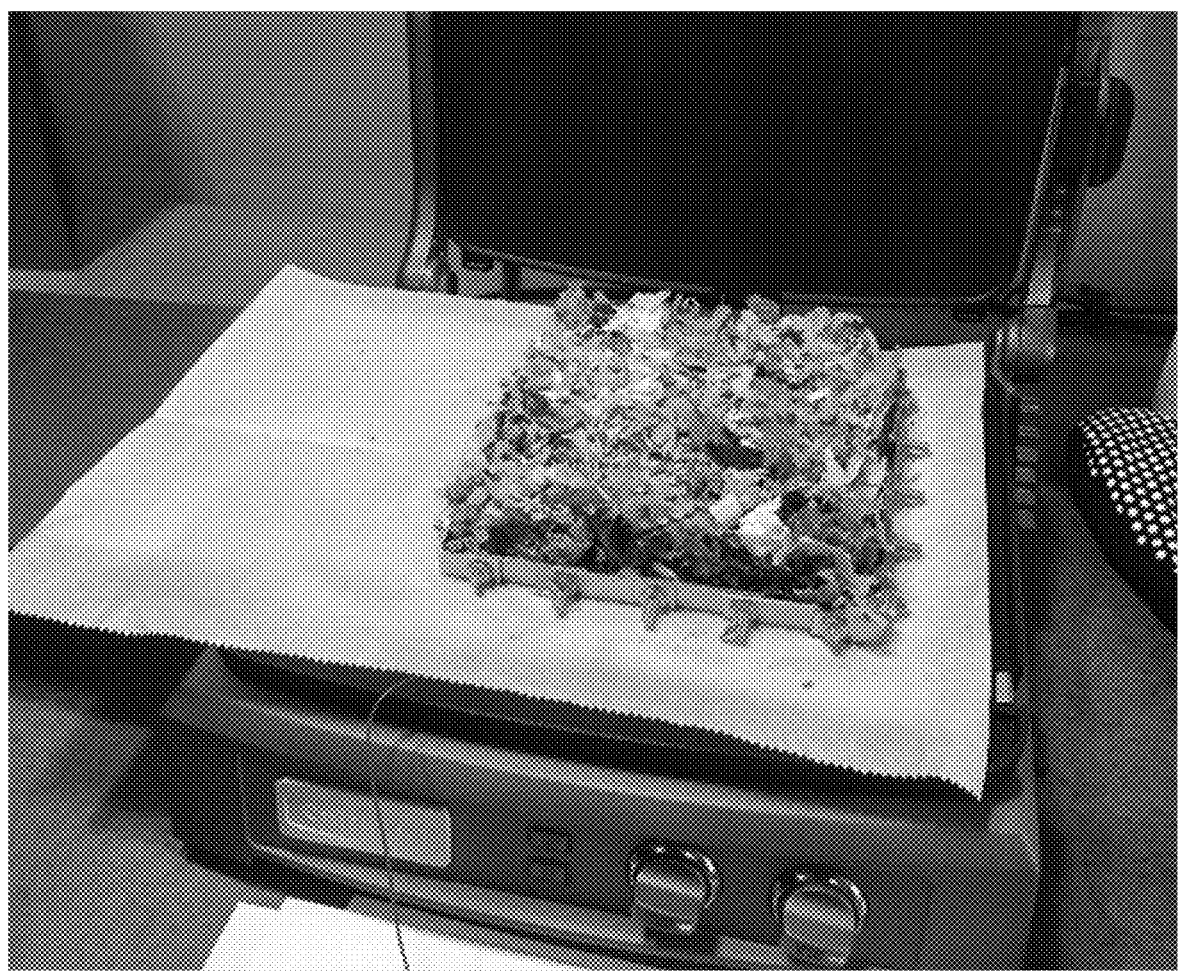
FIG. 4 depicts a non-limiting example of a cooking press with a mat of untreated paper/plastic fragments.

The wooden forming frame was removed from the assembly while compressing the layer of paper/plastic fragments. The caul sheet with release paper and the mat of paper/plastic fragments inside of the metal frame was then placed on the bottom platen of a cooking press (Griddler Deluxe, Model GR-150 by Cuisinart). The press was set at a temperature of about 380-400° F., which was measured by use of a thermo-couple. See FIG. 4.

The top of the mat was covered with a second sheet of release paper and the top platen was immediately closed such that the top and bottom platens were in contact with the metal frame. The platens remained closed for a period of 8 minutes and were then opened. The resulting panel was removed from the press and placed in a sterile metal pan inside of a hood to cool for a period of about 20 minutes. The cooled panel was isolated from the release paper and the metal forming frame. These steps were conducted while wearing sterile gloves, a Tyvek suit and a face mask to help prevent microbial contamination of the product. The isolated panel was immediately packaged in a sterile bag.

Shortly after making the panel, small samples (10 g each) were isolated from the middle region of the dry lab panels. The samples were immediately loaded into sterile containers and shipped to Eurofins EMLab P&K [Marlton, N.J.] for cell culture testing. In this process, small portions of the samples (50-100 mg) were measured for mass and were then extracted in phosphate-buffered water (1 mL). Portions of the extract were then used to inoculate cell culture plate media (tryptic soy agar for bacteria and malt extract agar for fungi). The media were incubated for 5-7 days and then stained. Organisms on the media were counted and reported as colony formation units (CFU) per gram of fragment sample. An attempt was made to conduct specific counts for different organism species or groups. Dilutions were used for samples with relatively high microbial activity.

Additional samples (100 g each) were isolated from the middle region of the lab panels. These larger samples were loaded into clean, new wide-mouth plastic containers along with sterile, cell-culture grade water (300 g). The containers were immediately capped and were manually shaken in a vertical motion for 10 s in order to wet all of the panel material. The containers were then agitated in a shaker for a period of 60 s. The loaded containers were then conditioned for 18-22 h at a temperature of 65-70° F. and were then subjected to agitation in the shaker for a second period of 60 s. The containers were then opened and samples of liquor extract (100-110 g) were decanted into sterile sample vials, which were immediately capped and labeled. These extracts were immediately shipped to Eurofins EMLab P&K [Marlton, N.J.] for cell culture testing. Portions of the extracts were used to inoculate cell culture plate media (tryptic soy agar for bacteria and malt extract agar for fungi). The media were incubated for 5-7 days and then stained. Organisms on the media were counted and reported as colony formation units (CFU) per gram of fragment sample. An attempt was made to conduct specific counts for different organism species or groups. Dilutions were used for samples with relatively high microbial activity. Cell culture test results for the dry lab panels and the associated extracts are shown in Tables 3 and 4. A blank sample with just sterile, cell-culture grade water (300 g) was subjected to the entire extraction process and then tested for cultured bacteria. No bacterial growth was detected. A blank sample with just sterile, cell-culture grade water (300 g) was subjected to the entire extraction process and then tested for cultured fungi. No fungal growth was detected. The results demonstrate that the hot-pressing step used to convert untreated, recovered paper and plastic fragments into building material composites reduced both the bacterial and the fungal activity of the fragments. However, addition of water to the composite panels resulted in high levels of cultured bacteria.

TABLE 3

Cultured Bacteria Levels Associated with Dry Lab Panels and Extracts of Lab Panels for Lab Panels Made from Untreated Recovered Paper/Plastic Fragments

| SAMPLE | CULTURED BACTERIA LEVEL (CFU/g) IN INITIAL PAPER/PLASTIC FRAGMENTS (SEE TABLE 1) | CULTURED BACTERIA LEVEL (CFU/g) IN DRY PANEL | CULTURED BACTERIA LEVEL (CFU/mL) IN EXTRACT OF PANEL |
|---|---|---|---|
| 9N | 34,000,000 | 8,500 | 580,000 |
| 10N | 37,000,000 | 2,700 | 3,000,000 |

TABLE 3-continued

Cultured Bacteria Levels Associated with Dry Lab Panels and Extracts of Lab Panels for Lab Panels Made from Untreated Recovered Paper/Plastic Fragments

| SAMPLE | CULTURED BACTERIA LEVEL (CFU/g) IN INITIAL PAPER/PLASTIC FRAGMENTS (SEE TABLE 1) | CULTURED BACTERIA LEVEL (CFU/g) IN DRY PANEL | CULTURED BACTERIA LEVEL (CFU/mL) IN EXTRACT OF PANEL |
|---|---|---|---|
| 11N | 970,000 | 2,300 | 170,000 |
| AVERAGE | 24,000,000 | 4,500 | 1,250,000 |

TABLE 4

Cultured Fungi Levels Associated with Dry Lab Panels and Extracts of Lab Panels for Lab Panels Made from Untreated Recovered Paper/Plastic Fragments

| SAMPLE | CULTURED FUNGAL LEVEL (CFU/g) IN INITIAL PAPER/PLASTIC FRAGMENTS (SEE TABLE 1) | CULTURED FUNGAL LEVEL (CFU/g) IN DRY PANEL | CULTURED FUNGAL LEVEL (CFU/mL) IN EXTRACT OF PANEL |
|---|---|---|---|
| 9N | 960,000 | N.D. | 370 |
| 10N | 3,700 | N.D. | 510 |
| 11N | 1,700 | N.D. | N.D. |
| AVERAGE | 322,000 | 0 | 293 |

N.D. = none detected

Example 4: Effect of a Multifunctional Aldehyde on the Water-Soluble Endotoxin Level in Recovered Paper & Plastic Fragments A portion of sample #7 from Example 1 was treated with a multifunctional aldehyde and was then assayed for water-soluble endotoxins.

Recovered paper/plastic sample batches (500 g, as-is basis, #7 sample from Example 1) were loaded into a plastic bin (16.125"×11.25"×6.75") and were then sprayed with aqueous glutaraldehyde solutions at various target levels. In this process, the loaded bin was weighed initially and was then re-weighed repeatedly during the application of the glutaraldehyde solution until the target application level was achieved. The bin was repeatedly closed and shaken during this process in order to obtain a uniform distribution of the glutaraldehyde on the fragments. The treated paper/plastic fragments were conditioned for 90 minutes at a temperature of 65-70° F. and were then extracted with water as previously described in Example 2. Extract liquors were then collected and assayed for water-soluble endotoxin levels as previously described in Example 2. The results demonstrate that treatment of recovered paper/plastic fragments with a multifunctional aldehyde substantially reduced the level of water-soluble endotoxin on the fragments.

TABLE 5

Water-Soluble Endotoxin Levels in Extracts Derived from Recovered Paper/Plastic Fragments that were Treated with Glutaraldehyde

| SAMPLE | GLUTARALDEHYDE SOLUTION CONCENTRATION (%) | GLUTARALDEHYDE SOLUTION APPLICATION LEVEL (g) | GLUTARALDEHYDE LEVEL ON PAPER/PLASTIC FRAGMENTS (PPM, AS IS BASIS) | ENDOTOXIN CONCENTRATION (ng/mL) |
|---|---|---|---|---|
| 7N | NONE | NONE | 0 | 7,700 |
| 7T1 | 5.0 | 10.0 | 999 | 116 |
| 7T2 | 7.0 | 12.5 | 1,747 | 277 |
| 7T3 | 9.0 | 13.9 | 2,494 | 40 |

The results of Example 4 provide a demonstration that the mixture of paper and plastic fragments treated with glutaraldehyde at a level of 999 ppm had a water-soluble endotoxin level of about 1,160 ng per gram of fragments. Specifically, the extract had a volume of 200 mL and a water-soluble endotoxin level of 116 ng/mL. Thus, the total amount of water soluble endotoxin in the extract was 23,200 ng. This water-soluble endotoxin was derived from 20 g of untreated paper and plastic fragments. Thus, the treated paper and plastic fragments had a water-soluble endotoxin level of 1,160 ng/g.

The results of Example 4 provide a demonstration that the mixture of paper and plastic fragments treated with glutaraldehyde at a level of 1,747 ppm had a water-soluble endotoxin level of about 2,770 ng per gram of fragments. Specifically, the extract had a volume of 200 mL and a water-soluble endotoxin level of 277 ng/mL. Thus, the total amount of water soluble endotoxin in the extract was 55,400 ng. This water-soluble endotoxin was derived from 20 g of untreated paper and plastic fragments. Thus, the treated paper and plastic fragments had a water-soluble endotoxin level of 2,770 ng/g.

The results of Example 4 provide a demonstration that the mixture of paper and plastic fragments treated with glutaraldehyde at a level of 2,494 ppm had a water-soluble endotoxin level of about 400 ng per gram of fragments. Specifically, the extract had a volume of 200 mL and a water-soluble endotoxin level of 40 ng/mL. Thus, the total amount of water soluble endotoxin in the extract was 8,000 ng. This water-soluble endotoxin was derived from 20 g of untreated paper and plastic fragments. Thus, the treated paper and plastic fragments had a water-soluble endotoxin level of 400 ng/g.

Example 5: Effect of Treating Recovered Paper & Plastic Fragments with a Multifunctional Aldehyde A portion of samples #9, #10 and #11 from Example 1 were treated with a multifunctional aldehyde and then used to make lab-scale composite building material panels. Recovered paper/plastic sample batches (500 g, as-is basis, #9, #10 and #11 samples from Example 1) were loaded separately into a plastic bin (16.125"×11.25"×6.75") and were then sprayed with aqueous glutaraldehyde solutions at various target levels. In this process, the loaded bin was weighed initially and was then re-weighed repeatedly during the application of the glutaraldehyde solution until the target application level was achieved. The bin was repeatedly closed and shaken during this process in order to obtain a uniform distribution of the glutaraldehyde on the fragments.

Recovered paper and plastic fragment mixtures treated in this manner were allowed to condition for a period of about 15-30 minutes at a temperature of about 60-70° F. within closed bins and were then used to make lab-scale composite panels as described in Example 3. No odor of glutaraldehyde could be detected in the lab-scale composite panels immediately after making them.

The resulting fresh, dry panels were then subjected to cultured cell growth tests as described in Example 3. Additional samples from the composite lab-panels were subjected to the extraction procedure described in Example 3. The liquor from this extraction process was also subjected to cultured cell growth tests as described in Example 3. Test results are shown in tables 6 and 7.

The results demonstrate that treatment of recovered paper/plastic fragments with glutaraldehyde reduced the level of bacterial activity in fresh, dry composite panels derived from the fragments, as well as the bacterial activity of aqueous extracts of the composite panels derived from the fragments. Likewise, treatment of recovered paper/plastic fragments with glutaraldehyde reduced the level of fungal activity of aqueous extracts of composite panels derived from the fragments. The lack of any glutaraldehyde odor in the composite panels that were made with fragments that were treated with glutaraldehyde is consistent with the polymerization of the glutaraldehyde during the hot-pressing process. (Glutaraldehyde has a strong odor and can generally be detected at air-borne concentrations of about 40 ppb.) Autopolymerization of glutaraldehyde is known. See Margel, S. and Rembaum, A. "*Synthesis and Characterization of Poly (glutaraldehyde). A Potential Reagent for Protein Immobilization and Cell Separation*", Macromolecules: 13(1), p 19-24 (1980).

TABLE 6

Cultured Bacteria Levels Associated with Dry Lab Panels and Extracts of Lab Panels for Lab Panels Made from Recovered Paper/Plastic Fragments that were Treated with Glutaraldehyde

| SAMPLE | GLUTARALDEHYDE SOLUTION CONCENTRATION (%) | GLUTARALDEHYDE SOLUTION APPLICATION LEVEL (g) | GLUTARALDEHYDE LEVEL ON PAPER/PLASTIC FRAGMENTS (PPM, AS IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|---|
| 9N | NONE | NONE | 0 | 8,500 | 580,000 |
| 10N | NONE | NONE | 0 | 2,700 | 3,000,000 |
| 11N | NONE | NONE | 0 | 2,300 | 170,000 |
| AVERAGE | | | 0 | 4,500 | 1,250,000 |
| 9N | 5.0 | 10.0 | 999 | 140 | 610 |
| 10N | 5.0 | 10.0 | 999 | N.D. | 1,500 |
| 11N | 5.0 | 10.0 | 999 | N.D. | 50 |
| AVERAGE | 5.0 | 10.0 | 999 | 47 | 720 |
| 9N | 7.0 | 12.5 | 1,747 | 110 | 50 |
| 10N | 7.0 | 12.5 | 1,747 | N.D. | 3,500 |
| 11N | 7.0 | 12.5 | 1,747 | N.D. | 20 |
| AVERAGE | 7.0 | 12.5 | 1,747 | 37 | 1,190 |
| 9N | 9.0 | 13.9 | 2,494 | N.D. | 60 |
| 10N | 9.0 | 13.9 | 2,494 | N.D. | 1,900 |
| 11N | 9.0 | 13.9 | 2,494 | N.D. | 1,100 |
| AVERAGE | 9.0 | 13.9 | 2,494 | 0 | 1,020 |

N.D. = none detected

TABLE 7

Cultured Fungi Levels Associated with Dry Lab Panels and Extracts of Lab Panels for Lab Panels Made from Recovered Paper/Plastic Fragments that were Treated with Glutaraldehyde

| SAMPLE | GLUTARALDEHYDE SOLUTION CONCENTRATION (%) | GLUTARALDEHYDE SOLUTION APPLICATION LEVEL (g) | GLUTARALDEHYDE LEVEL ON PAPER/PLASTIC FRAGMENTS (PPM, AS IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|
| 9N | NONE | NONE | 0 | N.D. | 370 |
| 10N | NONE | NONE | 0 | N.D. | 510 |

TABLE 7-continued

Cultured Fungi Levels Associated with Dry Lab Panels and Extracts of Lab Panels for
Lab Panels Made from Recovered Paper/Plastic Fragments that were Treated with Glutaraldehyde

| SAMPLE | GLUTARALDEHYDE SOLUTION CONCENTRATION (%) | GLUTARALDEHYDE SOLUTION APPLICATION LEVEL (g) | GLUTARALDEHYDE LEVEL ON PAPER/PLASTIC FRAGMENTS (PPM, AS IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|
| 11N | NONE | NONE | 0 | N.D. | N.D. |
| AVERAGE | | | 0 | 0 | 293 |
| 9N | 5.0 | 10.0 | 999 | N.D. | 30 |
| 10N | 5.0 | 10.0 | 999 | N.D. | 50 |
| 11N | 5.0 | 10.0 | 999 | N.D. | N.D. |
| AVERAGE | 5.0 | 10.0 | 999 | 0 | 27 |
| 9N | 7.0 | 12.5 | 1,747 | N.D. | N.D. |
| 10N | 7.0 | 12.5 | 1,747 | N.D. | N.D. |
| 11N | 7.0 | 12.5 | 1,747 | N.D. | N.D. |
| AVERAGE | 7.0 | 12.5 | 1,747 | 0 | 0 |
| 9N | 9.0 | 13.9 | 2,494 | N.D. | N.D. |
| 10N | 9.0 | 13.9 | 2,494 | N.D. | N.D. |
| 11N | 9.0 | 13.9 | 2,494 | N.D. | N.D. |
| AVERAGE | 9.0 | 13.9 | 2,494 | 0 | 0 |

N.D. = none detected

The results shown in Table 7 are particularly surprising and unexpected. Specifically, the act of soaking portions of the untreated composite panel in water was associated with some level of increased fungal growth, relative to the fresh dry composite panel. Treatment of the fragments with glutaraldehyde prior to making the composite was associated with a reduction in the fungal growth of the soaked panels. The implication is that the polymerized glutaraldehyde provided a protective effect to the panel under wet conditions. In fact, the polymerized glutaraldehyde also appears to provide a protective effect against bacterial growth to the composite under wet conditions (see Table 6). These observations are in direct conflict with previous published studies in which investigators have concluded that polymerized glutaraldehyde does not have biocidal activity. For example, see Sehmi, S. K., Allan, E., MacRobert, A. J., and Parkin, I. "*The bactericidal activity of glutaraldehyde-impregnated polyurethane*", Microbiologyopen 5(5), p 891-897 (2016). Thus, the beneficial effect of polymerized multifunctional aldehyde, (e.g., polyglutaraldehde), in the composite building material was unexpected.

Example 6: Effect of Treating Recovered Paper & Plastic Fragments with Multifunctional Aldehyde (Urea-Aldehyde Adducts Formed Prior to Application)

Urea-glutaraldehyde adducts were prepared by mixing 6% urea solution (aq) with 9% glutaraldehyde solution (aq) and water. See Table 8. The mixtures were allowed to react at a temperature of 60-70° F. for a period of 1-day prior to application. All solutions were colorless, transparent, low-viscosity mixtures and were stable for a storage period of greater than 1 month.

TABLE 8

Urea-Glutaraldehyde Adduct Treatment Solutions

| G/U MOLAR RATIO | 6% UREA SOLUTION | 9% GLUTARALDEHYDE SOLUTION | WATER | ADDUCT CONCENTRATION (%) |
|---|---|---|---|---|
| 5.0 | 15.0 | 83.3 | 26.0 | 6.8 |
| 3.0 | 22.5 | 75.0 | 15.0 | 7.2 |
| 2.0 | 29.3 | 65.0 | 3.0 | 7.8 |

The urea-glutaraldehyde adduct solutions with G/U molar ratios of 2 and 3 had less odor of glutaraldehyde than that of the adduct solution with a G/U molar ratio of 5.

Recovered paper/plastic sample batches (500 g, as-is basis, #9 samples from Example 1) were loaded separately into a plastic bin (16.125"×11.25"×6.75") and were then sprayed with aqueous urea-glutaraldehyde adduct solutions at various target levels. In this process, the loaded bin was weighed initially and was then re-weighed repeatedly during the application of the urea-glutaraldehyde solution until the target application level was achieved. The bin was repeatedly closed and shaken during this process in order to obtain a uniform distribution of the urea-glutaraldehyde on the fragments.

Recovered paper and plastic fragment mixtures treated in this manner were allowed to condition for a period of about 15-30 minutes at a temperature of about 60-70° F. within closed bins and were then used to make lab-scale composite panels as described in example 3. No odor of glutaraldehyde could be detected in the lab-scale composite panels immediately after making them. The resulting fresh, dry panels were then subjected to cultured cell growth tests as described in Example 3. Additional samples from the composite lab-panels were subjected to the extraction procedure described in Example 3. The liquor from this extraction process was also subjected to cultured cell growth tests as described in Example 3. Test results are shown in Tables 9 and 10.

The results demonstrate that treatment of recovered paper/plastic fragments with urea-glutaraldehyde adduct that was formed prior to application reduced the level of bacterial activity in fresh, dry composite panels derived from the fragments, as well as the bacterial activity of aqueous extracts of the composite panels derived from the fragments. Likewise, treatment of recovered paper/plastic fragments with urea-glutaraldehyde adduct that was formed prior to application reduced the level of fungal activity of aqueous extracts of composite panels derived from the fragments.

on the fragments. Recovered paper and plastic fragment mixtures treated in this manner were allowed to condition for a period of about 15-30 minutes at a temperature of about 60-70° F. within closed bins and were then used to make lab-scale composite panels as described in Example 3. No odor of glutaraldehyde could be detected in the lab-scale composite panels immediately after making them. The resulting fresh, dry panels were then subjected to cultured

TABLE 9

Cultured Bacteria Levels Associated with Dry Lab Panels and Extracts of Lab Panels for Lab Panels Made from Recovered Paper/Plastic Fragments that were Treated with Urea-Glutaraldhyde Adducts that were Formed Prior to Application

| SAMPLE | G/U MOLAR RATIO | UREA-GLUTARALDEHYDE SOLUTION CONCENTRATION (%) | UREA-GLUTARALDEHYDE SOLUTION APPLICATION LEVEL (g) | UREA-GLUTARALDEHYDE LEVEL ON PAPER/PLASTIC FRAGMENTS (PPM, AS-IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|---|---|
| 9N | N.A. | NONE | NONE | 0 | 8,500 | 580,000 |
| 9T4 | 5.0 | 6.8 | 20.7 | 2,807 | N.D. | 50 |
| 9T5 | 3.0 | 7.2 | 20.8 | 2,986 | N.D. | 40 |
| 9T6 | 2.0 | 7.8 | 20.8 | 3,234 | N.D. | N.D. |

N.D. = none detected

TABLE 10

Cultured Fungi Levels Associated with Dry Lab Panels and Extracts of Lab Panels for Lab Panels Made from Recovered Paper/Plastic Fragments that were Treated with Urea-Glutaraldhyde Adducts that were Formed Prior to Application

| SAMPLE | G/U MOLAR RATIO | UREA-GLUTARALDEHYDE SOLUTION CONCENTRATION (%) | UREA-GLUTARALDEHYDE SOLUTION APPLICATION LEVEL (g) | UREA-GLUTARALDEHYDE LEVEL ON PAPER/PLASTIC FRAGMENTS (PPM, AS-IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|---|
| 9N | N.A. | NONE | NONE | 0 | N.D. | 370 |
| 9T4 | 5.0 | 6.8 | 20.7 | 2,807 | N.D. | N.D. |
| 9T5 | 3.0 | 7.2 | 20.8 | 2,986 | N.D. | N.D. |
| 9T6 | 2.0 | 7.8 | 20.8 | 3,234 | N.D. | N.D. |

N.D. = none detected

Example 7: Effect of Treating Recovered Paper & Plastic Fragments with Multifunctional Aldehyde (Urea-Aldehyde Adducts Formed In-Situ Subsequent to Application)

Recovered paper/plastic sample batches (500 g, as-is basis, #9 samples from Example 1) were loaded separately into a plastic bin (16.125"×11.25"×6.75") and were then sprayed with a 9% glutaraldehyde solution (aq.) and then immediately thereafter with a 3% urea solution (aq.). The applied glutaraldehyde and urea were allowed to react on and within the fragments to form urea-glutaraldehyde adducts. In this process, the loaded bin was weighed initially and was then re-weighed repeatedly during the application of the glutaraldehyde and urea solutions until the target application levels were achieved. The bin was repeatedly closed and shaken during this process in order to obtain a uniform distribution of the urea and glutaraldehyde solutions on the fragments. Recovered paper and plastic fragment mixtures treated in this manner were allowed to condition for a period of about 15-30 minutes at a temperature of about 60-70° F. within closed bins and were then used to make lab-scale composite panels as described in Example 3. No odor of glutaraldehyde could be detected in the lab-scale composite panels immediately after making them. The resulting fresh, dry panels were then subjected to cultured cell growth tests as described in Example 3. Additional samples from the composite lab-panels were subjected to the extraction procedure described in Example 3. The liquor from this extraction process was also subjected to cultured cell growth tests as described in Example 3. Test results are shown in Tables 11 and 12.

The results demonstrate that treatment of recovered paper/plastic fragments with a urea-glutaraldehyde adduct that was formed in-situ reduced the level of bacterial activity in fresh, dry composite panels derived from the fragments, as well as the bacterial activity of aqueous extracts of the composite panels derived from the fragments. Likewise, treatment of recovered paper/plastic fragments with urea-glutaraldehyde adduct that was formed in-situ reduced the level of fungal activity of aqueous extracts of composite panels derived from the fragments.

TABLE 11

Cultured Bacteria Levels Associated with Dry Lab Panels and Extracts of Lab Panels for Lab Panels
Made from Recovered Paper/Plastic Fragments that were Treated with Urea-Glutaraldhyde Adducts that were
Formed In-Situ

| SAMPLE | G/U MOLAR RATIO | 9% GLUTARALDEHYDE SOLUTION APPLICATION LEVEL (g) | 3% UREA SOLUTION APPLICATION LEVEL (g) | UREA-GLUTARALDEHYDE LEVEL ON PAPER/PLASTIC FRAGMENTS (PPM, AS-IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|---|---|
| 9N | N.A. | NONE | NONE | 0 | 8,500 | 580,000 |
| 9T7 | 4.0 | 13.9 | 6.3 | 2,872 | N.D. | 10 |
| 9T8 | 2.0 | 13.9 | 12.5 | 3,249 | N.D. | 10 |
| 9T9 | 1.5 | 13.9 | 16.7 | 3,488 | N.D. | N.D. |

N.D. = none detected

TABLE 12

Cultured Fungi Levels Associated with Dry Lab Panels and Extracts of Lab Panels for Lab Panels
Made from Recovered Paper/Plastic Fragments that were Treated with Urea-Glutaraldhyde Adducts that were
Formed In-Situ

| SAMPLE | G/U MOLAR RATIO | 9% GLUTARALDEHYDE SOLUTION APPLICATION LEVEL (g) | 3% UREA SOLUTION APPLICATION LEVEL (g) | UREA-GLUTARALDEHYDE LEVEL ON PAPER/PLASTIC FRAGMENTS (PPM, AS-IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|---|
| 9N | N.A. | NONE | NONE | 0 | N.D. | 370 |
| 9T7 | 4.0 | 13.9 | 6.3 | 2,872 | N.D. | N.D. |
| 9T8 | 2.0 | 13.9 | 12.5 | 3,249 | N.D. | N.D. |
| 9T9 | 1.5 | 13.9 | 16.7 | 3,488 | N.D. | N.D. |

N.D. = none detected

Example 8: Effect of Treating Recovered Paper & Plastic Fragments with a Multifunctional Aldehyde and an Odor Blocker A recovered paper/plastic sample batch (500 g, as-is basis, #10 sample from Example 1) was loaded into a plastic bin (16.125"×11.25"×6.75") and was then sprayed with 9% glutaraldehyde solution (aq) (13.9 g). In this process, the loaded bin was weighed initially and was then re-weighed repeatedly during the application of the glutaraldehyde solution until the target application level was achieved. The bin was repeatedly closed and shaken during this process in order to obtain a uniform distribution of the glutaraldehyde on the fragments. The bin was then further charged with activated carbon (2.5 g). The bin was closed and shaken in order to uniformly distribute the activated carbon. Recovered paper and plastic fragment mixtures treated in this manner were allowed to condition for a period of about 15-30 minutes at a temperature of about 60-70° F. within closed bins and were then used to make lab-scale composite panels as described in Example 3. The activated carbon reduced the odor of glutaraldehyde on the freshly treated fragments. No odor of glutaraldehyde could be detected in the lab-scale composite panels immediately after making them. The resulting panels with activated carbon had less garbage-like odor than similar panels that did not contain the activated carbon. The resulting fresh, dry panels were then subjected to cultured cell growth tests as described in Example 3. Additional samples from the composite lab-panels were subjected to the extraction procedure described in Example 3. The liquor from this extraction process was also subjected to cultured cell growth tests as described in Example 3. Test results are shown in Tables 13 and 14.

The results demonstrated that treatment of recovered paper/plastic fragments with glutaraldehyde and activated carbon reduced the level of bacterial activity in fresh, dry composite panels derived from the fragments, as well as the bacterial activity of aqueous extracts of the composite panels derived from the fragments. Likewise, treatment of recovered paper/plastic fragments with glutaraldehyde and activated carbon reduced the level of fungal activity of aqueous extracts of composite panels derived from the fragments.

TABLE 13

Cultured Bacteria Levels Associated with Dry Lab Panels and Extracts of Lab Panels for Lab Panels Made from Recovered Paper/Plastic Fragments that were Treated with Glutaraldhyde and Activated Carbon

| SAMPLE | GLUTARALDEHYDE SOLUTION CONCENTRATION (%) | GLUTARALDEHYDE SOLUTION APPLICATION LEVEL (g) | GLUTARALDEHYDE LEVEL ON PAPER/PLASTIC FRAGMENTS (PPM, AS-IS BASIS) | ACTIVATED CARBON LEVEL ON PAPER/PLASTIC FRAGMENTS (PPM, AS-IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|---|---|
| 10N | NONE | NONE | 0 | 0 | 2,700 | 3,000,000 |
| 10T4 | 9.0 | 13.9 | 2,481 | 4,963 | N.D. | 4,800 |

N.D. = none detected

TABLE 14

Cultured Fungi Levels Associated with Dry Lab Panels and Extracts of Lab Panels for Lab Panels Made from Recovered Paper/Plastic Fragments that were Treated with Glutaraldhyde and Activated Carbon

| SAMPLE | GLUTARALDEHYDE SOLUTION CONCENTRATION (%) | GLUTARALDEHYDE SOLUTION APPLICATION LEVEL (g) | GLUTARALDEHYDE LEVEL ON PAPER/PLASTIC FRAGMENTS (PPM, AS-IS BASIS) | ACTIVATED CARBON LEVEL ON PAPER/PLASTIC FRAGMENTS (PPM, AS-IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|---|
| 10N | NONE | NONE | 0 | 0 | N.D. | 510 |
| 10T4 | 9.0 | 13.9 | 2,481 | 4,963 | N.D. | N.D. |

N.D. = none detected

Example 9: Effect of Treating Recovered Paper & Plastic Fragments with a Multifunctional Aldehyde and a Biocide A recovered paper/plastic sample batch (500 g, as-is basis, #10 sample from Example 1) was loaded into a plastic bin (16.125"×11.25"×6.75") and was then sprayed with 9% glutaraldehyde solution (aq.) (13.9 g). In this process the loaded bin was weighed initially and was then re-weighed repeatedly during the application of the glutaraldehyde solution until the target application level was achieved. The bin was repeatedly closed and shaken during this process in order to obtain a uniform distribution of the glutaraldehyde on the fragments. The bin was then further charged with disodium octaborate tetrahydrate (5.0 g). The bin was closed and shaken in order to uniformly distribute the disodium octaborate tetrahydrate.

Recovered paper and plastic fragment mixtures treated in this manner were allowed to condition for a period of about 15-30 minutes at a temperature of about 60-70° F. within closed bins and were then used to make lab-scale composite panels as described in example 3. No odor of glutaraldehyde could be detected in the lab-scale composite panels immediately after making them. The resulting fresh, dry panels were then subjected to cultured cell growth tests as described in Example 3. Additional samples from the composite lab-panels were subjected to the extraction procedure described in Example 3. The liquor from this extraction process was also subjected to cultured cell growth tests as described in Example 3. Test results are shown in tables 15 and 16.

The results demonstrated that treatment of recovered paper/plastic fragments with glutaraldehyde and disodium octaborate tetrahydrate reduced the level of bacterial activity in fresh, dry composite panels derived from the fragments, as well as the bacterial activity of aqueous extracts of the composite panels derived from the fragments. Likewise, treatment of recovered paper/plastic fragments with glutaraldehyde and disodium octaborate tetrahydrate reduced the level of fungal activity of aqueous extracts of composite panels derived from the fragments.

TABLE 15

Cultured Bacteria Levels Associated with Dry Lab Panels and Extracts of Lab Panels for Lab Panels Made from Recovered Paper/Plastic Fragments that were Treated with Glutaraldhyde and Disodium Octaborate Tetrahydrate

| SAMPLE | GLUTARALDEHYDE SOLUTION CONCENTRATION (%) | GLUTARALDEHYDE SOLUTION APPLICATION LEVEL (g) | GLUTARALDEHYDE LEVEL ON PAPER/PLASTIC FRAGMENTS (PPM, AS-IS BASIS) | DISODIUM OCTABORATE TETRAHYDRATE LEVEL ON PAPER/PLASTIC FRAGMENTS (PPM, AS-IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|---|---|
| 10N | NONE | NONE | 0 | 0 | 2,700 | 3,000,000 |
| 10T5 | 9.0 | 13.9 | 2,469 | 9,877 | N.D. | 3,100 |

N.D. = none detected

TABLE 16

Cultured Fungi Levels Associated with Dry Lab Panels and Extracts of Lab Panels for Lab Panels
Made from Recovered Paper/Plastic Fragments that were Treated with Glutaraldhyde and Disodium Octaborate Tetrahydrate

| SAMPLE | GLUTARALDEHYDE SOLUTION CONCENTRATION (%) | GLUTARALDEHYDE SOLUTION APPLICATION LEVEL (g) | GLUTARALDEHYDE LEVEL ON PAPER/PLASTIC FRAGMENTS (PPM, AS-IS BASIS) | DISODIUM OCTABORATE TETRAHYDRATE LEVEL ON PAPER/PLASTIC FRAGMENTS (PPM, AS-IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|---|
| 10N | NONE | NONE | 0 | 0 | N.D. | 510 |
| 10T5 | 9.0 | 13.9 | 2,469 | 9,877 | N.D. | N.D. |

N.D. = none detected

Example 10: Effect of Treating Recovered Paper & Plastic Fragments with a Multifunctional Aldehyde, an Odor Blocker, and a Biocide A recovered paper/plastic sample batch (500 g, as-is basis, #10 sample from Example 1) was loaded into a plastic bin (16.125"×11.25"×6.75") and was then sprayed with 9% glutaraldehyde solution (aq.) (13.9 g). In this process the loaded bin was weighed initially and was then re-weighed repeatedly during the application of the glutaraldehyde solution until the target application level was achieved. The bin was repeatedly closed and shaken during this process in order to obtain a uniform distribution of the glutaraldehyde on the fragments. The bin was then further charged with disodium octaborate tetrahydrate (5.0 g). The bin was closed and shaken in order to uniformly distribute the disodium octaborate tetrahydrate. The bin was then further charged with activated carbon (2.5 g). The bin was closed and shaken in order to uniformly distribute the activated carbon. Recovered paper and plastic fragment mixtures treated in this manner were allowed to condition for a period of about 15-30 minutes at a temperature of about 60-70° F. within closed bins and were then used to make lab-scale composite panels as described in Example 3. The activated carbon reduced the odor of glutaraldehyde on the freshly treated fragments. No odor of glutaraldehyde could be detected in the lab-scale composite panels immediately after making them. The resulting panels with activated carbon had less garbage-like odor than similar panels that did not contain the activated carbon. The resulting fresh, dry panels were then subjected to cultured cell growth tests as described in Example 3. Additional samples from the composite lab-panels were subjected to the extraction procedure described in Example 3. The liquor from this extraction process was also subjected to cultured cell growth tests as described in Example 3. Test results are shown in tables 17 and 18. The results demonstrate that treatment of recovered paper/plastic fragments with glutaraldehyde, activated carbon and disodium octaborate tetrahydrate reduced the level of bacterial activity in fresh, dry composite panels derived from the fragments, as well as the bacterial activity of aqueous extracts of the composite panels derived from the fragments. Likewise, treatment of recovered paper/plastic fragments with glutaraldehyde, activated carbon and disodium octaborate tetrahydrate reduced the level of fungal activity of aqueous extracts of composite panels derived from the fragments.

TABLE 17

Cultured Bacteria Levels Associated with Dry Lab Panels and Extracts of Lab Panels for Lab Panels
Made from Recovered Paper/Plastic Fragments that were Treated with Glutaraldhyde, Activated Carbon and
Disodium Octaborate Tetrahydrate

| SAMPLE | GLUTARALD. SOLUTION CONC. (%) | GLUTARALD. SOLUTION APPLICATION LEVEL (g) | GLUTARALD. LEVEL ON PAPER/PLASTIC FRAGMENTS (PPM, AS-IS BASIS) | ACTIVATED CARBON LEVEL ON PAPER/PLASTIC FRAGMENTS (PPM, AS-IS BASIS) | DISODIUM OCTABORATE TETRAHYDRATE LEVEL ON PAPER/PLASTIC FRAGMENTS (PPM, AS-IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|---|---|---|
| 10N | NONE | NONE | 0 | 0 | 0 | 2,700 | 3,000,000 |
| 10T6 | 9.0 | 13.9 | 2,457 | 4,914 | 9,828 | N.D. | 2,800 |

N.D. = none detected

TABLE 18

Cultured Fungi Levels Associated with Dry Lab Panels and Extracts of Lab Panels for Lab Panels
Made from Recovered Paper/Plastic Fragments that were Treated with Glutaraldhyde, Activated Carbon and
Disodium Octaborate Tetrahydrate

| SAMPLE | GLUTARALD. SOLUTION CONC. (%) | GLUTARALD. SOLUTION APPLICATION LEVEL (g) | GLUTARALD. LEVEL ON PAPER/PLASTIC FRAGMENTS (PPM, AS-IS BASIS) | ACTIVATED CARBON LEVEL ON PAPER/PLASTIC FRAGMENTS (PPM, AS-IS BASIS) | DISODIUM OCTABORATE TETRAHYDRATE LEVEL ON PAPER/PLASTIC FRAGMENTS (PPM, AS-IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|---|---|
| 10N | NONE | NONE | 0 | 0 | 0 | N.D. | 510 |
| 10T6 | 9.0 | 13.9 | 2,457 | 4,914 | 9,828 | N.D. | N.D. |

N.D. = none detected

Example 11: Effect of Treating Recovered Paper & Plastic Fragments with a Multifunctional Aldehyde and a Biocide A urea-glutaraldehyde adduct solution with a G/U molar ratio of 2.0 and percent solids of 13.0% was prepared by mixing a 40% urea solution (aq.) (30.0 g), 50% glutaraldehyde solution (aq.) (80.0 g) and water (290.0 g) and allowing the mixture to react at a temperature of 60-70° F. for a period of 1-day. The resulting solution was colorless, transparent, had a low viscosity and had relatively low odor.

A recovered paper/plastic sample batch (500 g, as-is basis, #10 sample from Example 1) was loaded into a plastic bin (16.125"×11.25"×6.75") and was then sprayed with 13% urea-glutaraldehyde adduct solution (aq.) (12.5 g). In this process the loaded bin was weighed initially and was then re-weighed repeatedly during the application of the glutaraldehyde solution until the target application level was achieved. The bin was repeatedly closed and shaken during this process in order to obtain a uniform distribution of the urea-glutaraldehyde on the fragments. The bin was then further charged with disodium octaborate tetrahydrate (5.0 g). The bin was closed and shaken in order to uniformly distribute the disodium octaborate tetrahydrate.

Recovered paper and plastic fragment mixtures treated in this manner were allowed to condition for a period of about 15-30 minutes at a temperature of about 60-70° F. within closed bins and were then used to make lab-scale composite panels as described in Example 3. No odor of glutaraldehyde could be detected in the lab-scale composite panels immediately after making them.

The resulting fresh, dry panels were then subjected to cultured cell growth tests as described in Example 3. Additional samples from the composite lab-panels were subjected to the extraction procedure described in Example 3. The liquor from this extraction process was also subjected to cultured cell growth tests as described in Example 3. Test results are shown in tables 19 and 20.

TABLE 19

Cultured Bacteria Levels Associated with Dry Lab Panels and Extracts of Lab Panels for Lab Panels
Made from Recovered Paper/Plastic Fragments that were Treated with Urea-Glutaraldhyde Adduct and
Disodium Octaborate Tetrahydrate

| SAMPLE | UREA-GLUTARALDEHYDE ADDUCT SOLUTION CONCENTRATION (%) | UREA-GLUTARALDEHYDE ADDUCT SOLUTION APPLICATION LEVEL (g) | UREA-GLUTARALDEHYDE ADDUCT LEVEL ON PAPER/PLASTIC FRAGMENTS (PPM, AS-IS BASIS) | DISODIUM OCTABORATE TETRAHYDRATE LEVEL ON PAPER/PLASTIC FRAGMENTS (PPM, AS-IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|---|---|
| 10N | NONE | NONE | 0 | 0 | 2,700 | 3,000,000 |
| 10T7 | 13.0 | 12.5 | 3,208 | 9,869 | N.D. | 5,100 |

N.D. = none detected

TABLE 20

Cultured Fungi Levels Associated with Dry Lab Panels and Extracts of Lab Panels for Lab Panels
Made from Recovered Paper/Plastic Fragments that were Treated with Urea-Glutaraldhyde Adduct and
Disodium Octaborate Tetrahydrate

| SAMPLE | UREA-GLUTARALDEHYDE ADDUCT SOLUTION CONCENTRATION (%) | UREA-GLUTARALDEHYDE ADDUCT SOLUTION APPLICATION LEVEL (g) | UREA-GLUTARALDEHYDE ADDUCT LEVEL ON PAPER/PLASTIC FRAGMENTS (PPM, AS-IS BASIS) | DISODIUM OCTABORATE TETRAHYDRATE LEVEL ON PAPER/PLASTIC FRAGMENTS (PPM, AS-IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|---|
| 10N | NONE | NONE | 0 | 0 | N.D. | 510 |
| 10T7 | 13.0 | 12.5 | 3,208 | 9,869 | N.D. | N.D. |

N.D. = none detected

The results demonstrate that treatment of recovered paper/plastic fragments with urea-glutaraldehyde adduct and disodium octaborate tetrahydrate reduced the level of bacterial activity in fresh, dry composite panels derived from the fragments, as well as the bacterial activity of aqueous extracts of the composite panels derived from the fragments. Likewise, treatment of recovered paper/plastic fragments with urea-glutaraldehyde adduct and disodium octaborate tetrahydrate reduced the level of fungal activity of aqueous extracts of composite panels derived from the fragments.

Example 12: Lack of Aldehyde Emission from a Composite Panel Made with a Multifunctional Aldehyde Paper and plastic fragments were prepared as described in Example 1. The fragments were continuously passed through a single-shaft shredder by Zerma Machinery & Recycling Technology Company Ltd [Shanghai, China]. A spray system was installed in a compartment between the shredder and the outfeed chute. Fragments were sprayed with a solution of 10% glutaraldehyde and 90% water as they passed through the shredder. The flow rate of the fragments and the glutaraldehyde solution was adjusted to achieve an application level of about 2,000 ppm glutaraldehyde on the fragments. The fragments were transferred into a bin and were stored at a temperature of about 80° F. for a period of about 15-30 minutes. The aged, treated fragments were then formed into a continuous mat (48" wide) and sandwiched between polyethylene films (3 mil thick) on the top and bottom major surfaces. This assembly was further sandwiched between kraft paper (54" wide, 42 lb/ream) on the top and bottom major surfaces. The assembly was then transferred into a first hot-press (54" width×8' length) with a bottom platen (T=385° F.) and a top platen (T=365° F.). The hot-press closed on the assembly and pressure (about 80 psi) was applied to the mat such that the gap between the top and bottom platens was maintained at about 0.40-0.42". After a period of 30 s the press opened for a period of 10 s in order to release steam that had developed in the core of the assembly. The press then cycled in a similar manner between closed and open positions seven more times, such that the total press time in the closed position was 4 minutes. The panel moved forward in the press about 2' each time the press opened. The assembly was then transported to a second hot-press (of similar dimensions) and the same pressing cycle was repeated. The assembly was then transported to a third press (of similar dimensions). The platens on the third press were maintained at a temperature of only 60° F. The assembly was pressed in the cold press at a pressure of about 10 psi for a period of about 5 minutes and 20 seconds. The cold press opened and closed four times during this period. The pressed panel moved forward about 2' during each open period. The cold compressed panel was then transported to a set of saws that trimmed the edges of the assembly to a width of 48". The assembly was further cut into segments that were 8' in length. In this manner, panels (4'×8'×0.41") were generated.

A single composite panel was selected within about 2 hours of the production process. A strip (48" long×3.0" wide) was cut across the width of the panel at the mid-point. This strip was immediately cut into 12 specimens (3.0"×3.0"×0.407").

Figure 5:
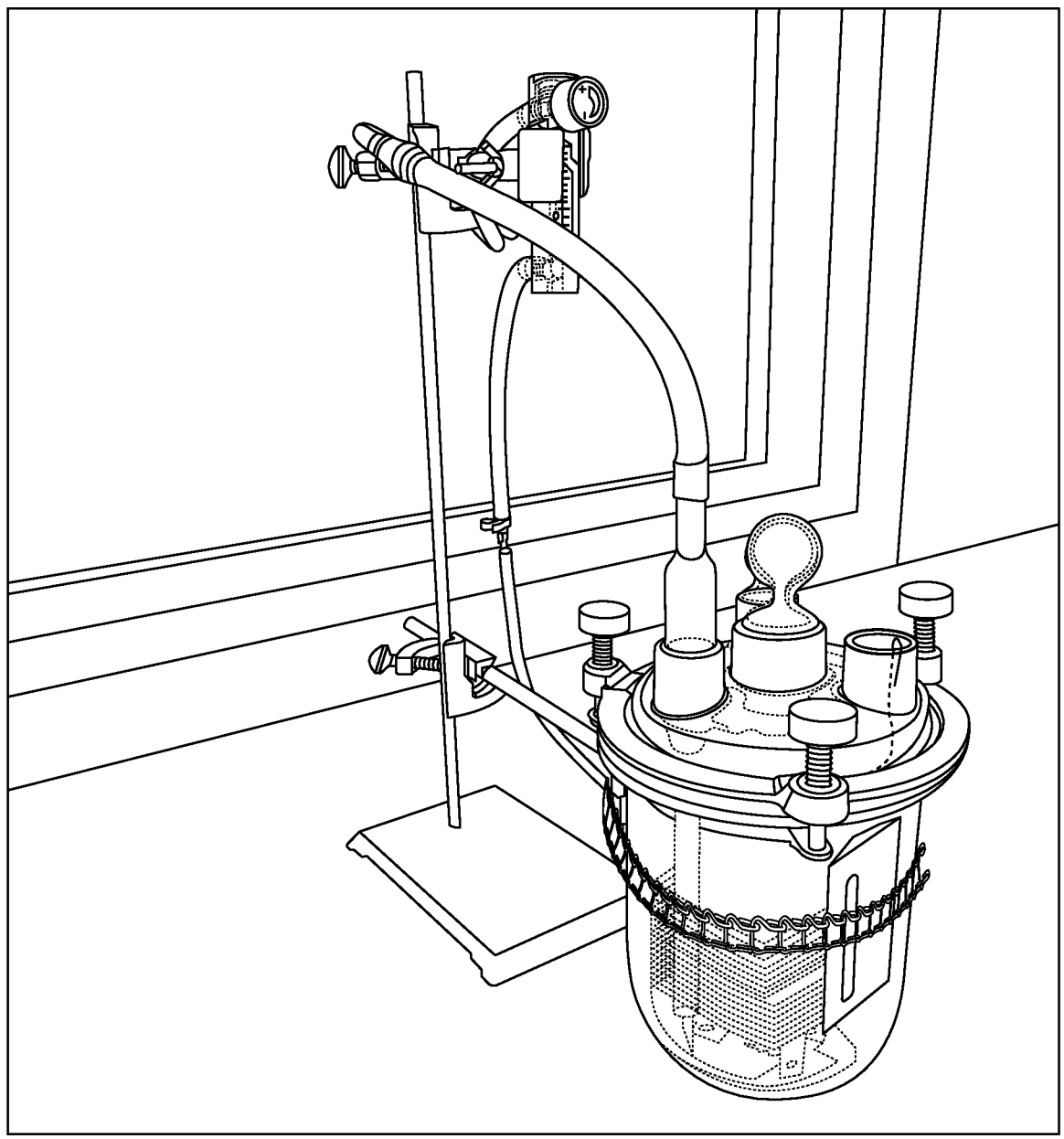
FIG. 5 depicts a non-limiting example of an emission test apparatus.

Six of the test specimens were selected and were immediately placed on a small metal stage at the bottom of a 2 L glass kettle. Air was pumped into the bottom of the kettle (0.4 L/min, 70° F.) through an adapter in the lid. Air exited the kettle through a different hole in the lid. A ChromAir glutaraldehyde detection badge, 380017-10 from Morphix Technologies [Virginia Beach, Va.] was suspended from the lid at the top of the chamber and hung directly above and adjacent to the specimen stack. See FIG. 5. The badge was opened and activated. Air sampling for glutaraldehyde occurred for a period of 15 minutes.

The badge was then removed, placed into its original container, and was allowed to develop for a 45-minute period. The badge was then read. No glutaraldehyde was detected. The detection limit on this badge type was 0.040 ppm.

The results demonstrate that all or most of the glutaraldehyde incorporated into the composite panel based on recovered paper/plastic fragments was converted into a non-volatile substance (presumably polymerized product).

Example 13: Effect of a Multifunctional Aldehyde Applied on a Production Line on the Water Soluble Endotoxin Level in Recovered Paper & Plastic Fragments Paper and plastic fragments were prepared as described in Example 1. The fragments were continuously passed through a single-shaft shredder by Zerma Machinery & Recycling Technology Company Ltd [Shanghai, China]. A spray system was installed in a compartment between the shredder and the outfeed chute. Fragments were sprayed with a solution of 10% glutaraldehyde and 90% water as they passed through the shredder. The flow rate of the fragments and the glutaraldehyde solution was adjusted to achieve an application level of about 2,000 ppm glutaraldehyde on the fragments. The fragments were collected as they emerged from the shredder. These fragments were immediately placed into clean plastic bags and were stored for a period of about 2 hours.

Other similar paper and plastic fragments were collected on the same day from the outfeed of the Zerma shredder, but were not treated with glutaraldehyde.

Treated and untreated paper/plastic fragments (20.0 g) were separately loaded into clean, new plastic jars (500 mL capacity) along with sterile cell culture water (200.0 g, temperature 70-75° F.). Each jar was capped and subsequently agitated in a shaker for a period of 1 minute. The mixtures were allowed to equilibrate at a temperature of 70-75° F. for a period of 1 h. Each capped jar was agitated a second time in a shaker for a period of 1 minute. Liquor (15 mL) was decanted from each jar and was loaded into sterile sample vials. Collected extract underwent endotoxin analysis using the L.A.L. kinetic chromogenic method. Test results are shown in Table 21.

TABLE 21

Water-Soluble Endotoxin Levels in Extracts Derived from Recovered Paper/Plastic Fragments with and without Glutaraldehyde Treatment

| SAMPLE | ENDOTOXIN CONCENTRATION (ng/mL) |
|---|---|
| Control (No Glutaraldehyde Treatment) | 9,130 |
| Test (Glutaraldehyde Treatment: 2,000 ppm) | 9.96 |
| Sterile Water Blank | 0.00 |

The results demonstrate that treatment of recovered paper/plastic fragments with a multifunctional aldehyde reduced over 99% of the water-soluble endotoxin on the fragments.

Additionally, the results of Example 13 provide a demonstration that the mixture of paper and plastic fragments with no treatment had a water-soluble endotoxin level of about 91,300 ng per gram of fragments. Specifically, the extract had a volume of 200 mL and a water-soluble endotoxin level of 9,130 ng/mL. Thus, the total amount of water soluble endotoxin in the extract was 1,826,000 ng. This water-soluble endotoxin was derived from 20 g of untreated paper and plastic fragments. Thus, the untreated paper and plastic fragments had a water-soluble endotoxin level of 91,300 ng/g.

The results of Example 13 provide a demonstration that the mixture of paper and plastic fragments treated with glutaraldehyde at a level of 2,000 ppm had a water-soluble endotoxin level of about 99.6 ng per gram of fragments. Specifically, the extract had a volume of 200 mL and a water-soluble endotoxin level of 9.96 ng/mL. Thus, the total amount of water soluble endotoxin in the extract was 1,992 ng. This water-soluble endotoxin was derived from 20 g of untreated paper and plastic fragments. Thus, the treated paper and plastic fragments had a water-soluble endotoxin level of 99.6 ng/g.

Based on the results of Example 13, about 99.9% of the water-soluble endotoxin in the original paper and plastic fragments was crosslinked by the glutaraldehyde and converted to water-insoluble material. Thus, a composite made from this treated material would contain about 91,200 ng of crosslinked endotoxin per gram of composite. This estimate neglects any mass contribution from the glutaraldehyde. So, it most likely understates what is actually present. Thus, the composite would contain more than about 0.009% crosslinked endotoxin.

Example 14: Effect of Treating Recovered Paper & Plastic Fragments with a Multifunctional Aldehyde A portion of sample #12 from Example 1 was treated with a multifunctional aldehyde and then used to make lab-scale composite building material panels. Recovered paper/plastic sample batch (500 g, as-is basis, #12 sample from Example 1) was loaded into a plastic bin (16.125"×11.25"×6.75") and was then sprayed with 10% aqueous glyoxal solution (target 12.5 g). In this process, the loaded bin was weighed initially and was then re-weighed repeatedly during the application of the glyoxal solution until the target application level was achieved. The bin was repeatedly closed and shaken during this process in order to obtain a uniform distribution of the glyoxal on the fragments.

Recovered paper and plastic fragment mixtures treated in this manner were allowed to condition for a period of about 15-30 minutes at a temperature of about 60-70° F. within the closed bin and were then used to make a lab-scale composite panel as described in Example 3. No odor of glyoxal could be detected in the lab-scale composite panels immediately after making it.

The resulting fresh, dry panel was then subjected to cultured cell growth tests as described in Example 3. An additional sample from the composite lab-panel was subjected to the extraction procedure described in Example 3. The liquor from this extraction process was also subjected to cultured cell growth tests as described in Example 3. Test results are shown in tables 22 and 23.

The results demonstrate that treatment of recovered paper/plastic fragments with glyoxal reduced the level of bacterial activity in fresh, dry composite panels derived from the fragments, as well as the bacterial activity of aqueous extracts of the composite panels derived from the fragments. The lack of any glyoxal odor in the composite panel that was made with fragments that were treated with glyoxal is consistent with the polymerization of the glyoxal during the hot-pressing process.

TABLE 22

Cultured Bacteria Levels Associated with Dry Lab Panels and Extracts of Lab Panels for Lab Panels Made from Recovered Paper/Plastic Fragments that were Treated with Glyoxal

| SAMPLE | GLYOXAL SOLUTION CONCENTRATION (%) | GLYOXAL SOLUTION APPLICATION LEVEL (g) | GLYOXAL LEVEL ON PAPER/PLASTIC FRAGMENTS (PPM, AS IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|---|
| 12N | NONE | NONE | 0 | 8,200 | 2,600,000 |
| 12T | 10.0 | 12.8 | 2,496 | 190 | 38,000 |

TABLE 23

Cultured Fungi Levels Associated with Dry Lab Panels and Extracts of Lab Panels for Lab Panels Made from Recovered Paper/Plastic Fragments that were Treated with Glyoxal

| SAMPLE | GLYOXAL SOLUTION CONCENTRATION (%) | GLYOXAL SOLUTION APPLICATION LEVEL (g) | GLYOXAL LEVEL ON PAPER/PLASTIC FRAGMENTS (PPM, AS IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|---|
| 12N | NONE | NONE | 0 | N.D. | N.D. |
| 12T | 10.0 | 12.8 | 2,496 | N.D. | 30 |

N.D. = none detected

Example 15: Effect of a Multifunctional Aldehyde on the Water-Soluble Endotoxin Level in Recovered Paper & Plastic Fragments A portion of sample #12 from Example 1 was treated with a multifunctional aldehyde and was then assayed for water-soluble endotoxins.

Recovered paper/plastic sample batch (500 g, as-is basis, #12 sample from Example 1) was loaded into a plastic bin (16.125"×11.25"×6.75") and was then sprayed with 10% aqueous glyoxal solution (target 12.5 g). In this process, the loaded bin was weighed initially and was then re-weighed repeatedly during the application of the glyoxal solution until the target application level was achieved. The bin was repeatedly closed and shaken during this process in order to obtain a uniform distribution of the glyoxal on the fragments.

The treated paper/plastic fragments were conditioned for 90 minutes at a temperature of 65-70° F. and were then extracted with water as previously described in Example 2. Extract liquors were then collected and assayed for water-soluble endotoxin levels as previously described in Example 2. The results demonstrate that treatment of recovered paper/plastic fragments with glyoxal only modestly reduced the level of water-soluble endotoxin on the fragments.

total amount of water soluble endotoxin in the extract was 929,600 ng. This water-soluble endotoxin was derived from 20 g of untreated paper and plastic fragments. Thus, the treated paper and plastic fragments had a water-soluble endotoxin level of 46,480 ng/g.

Example 16: Effect of Treating Recovered Paper & Plastic Fragments with a Multifunctional Aldehyde A portion of sample #12 from Example 1 was treated with a multifunctional aldehyde and then used to make lab-scale composite building material panels. Recovered paper/plastic sample batch (500 g, as-is basis, #12 sample from Example 1) was loaded into a plastic bin (16.125"×11.25"×6.75"). The bin was then charged with powdered phthalaldehyde (1.25 g). The bin then shaken in order to obtain a uniform distribution of the phthalaldehyde on the fragments.

Recovered paper and plastic fragment mixtures treated in this manner were allowed to condition for a period of about 15-30 minutes at a temperature of about 60-70° F. within the closed bin and were then used to make a lab-scale composite panel as described in Example 3. No odor of phthalaldehyde could be detected in the lab-scale composite panels immediately after making it.

TABLE 24

Water-Soluble Endotoxin Levels in Extracts Derived from Recovered Paper/Plastic Fragments that were Treated with Glyoxal

| SAMPLE | GLYOXAL SOLUTION CONCENTRATION (%) | GLYOXAL SOLUTION APPLICATION LEVEL (g) | GLYOXAL LEVEL ON PAPER/PLASTIC FRAGMENTS (PPM, AS IS BASIS) | ENDOTOXIN CONCENTRATION (ng/mL) |
|---|---|---|---|---|
| 12N | NONE | NONE | 0 | 4,897 |
| 12T | 10.0 | 12.8 | 2,496 | 4,648 |

The results of Example 15 provide a demonstration that the untreated mixture of paper and plastic fragments had a water-soluble endotoxin level of about 48,970 ng per gram of fragments. Specifically, the extract had a volume of 200 mL and a water-soluble endotoxin level of 4,897 ng/mL. Thus, the total amount of water soluble endotoxin in the extract was 979,400 ng. This water-soluble endotoxin was derived from 20 g of untreated paper and plastic fragments. Thus, the treated paper and plastic fragments had a water-soluble endotoxin level of 48,970 ng/g.

The results of Example 15 provide a demonstration that the mixture of paper and plastic fragments treated with glyoxal at a level of 2,496 ppm had a water-soluble endotoxin level of about 46,480 ng per gram of fragments. Specifically, the extract had a volume of 200 mL and a water-soluble endotoxin level of 4,648 ng/mL. Thus, the The resulting fresh, dry panel was then subjected to cultured cell growth tests as described in Example 3. An additional sample from the composite lab-panel was subjected to the extraction procedure described in Example 3. The liquor from this extraction process was also subjected to cultured cell growth tests as described in Example 3. Test results are shown in tables 25 and 26.

The results demonstrate that treatment of recovered paper/plastic fragments with phthalaldehyde reduced the level of bacterial activity in aqueous extracts of the composite panels derived from the fragments. The lack of any phthalaldehyde odor in the composite panel that was made with fragments that were treated with phthalaldehyde is consistent with the polymerization of the phthalaldehyde during the hot-pressing process.

TABLE 25

Cultured Bacteria Levels Associated with Dry Lab Panels and Extracts of Lab Panels for Lab Panels Made from Recovered Paper/Plastic Fragments that were Treated with Phthalaldehyde

| SAMPLE | PHTHALALDEHYDE SOLUTION APPLICATION LEVEL (g) | PHTHALALDEHYDE LEVEL ON PAPER/PLASTIC FRAGMENTS (PPM, AS IS BASIS) | CULTURED BACTERIA LEVEL (CFU/g) IN DRY PANEL | CULTURED BACTERIA LEVEL (CFU/mL) IN EXTRACT OF PANEL |
|---|---|---|---|---|
| 12N | NONE | 0 | 8,200 | 2,600,000 |
| 12T | 1.25 | 2,494 | 20,000 | 250 |

TABLE 26

Cultured Fungi Levels Associated with Dry Lab Panels and Extracts of Lab Panels for
Lab Panels Made from Recovered Paper/Plastic Fragments that were Treated with Phthalaldehyde

| SAMPLE | PHTHALALDEHYDE SOLUTION APPLICATION LEVEL (g) | PHTHALALDEHYDE LEVEL ON PAPER/PLASTIC FRAGMENTS (PPM, AS IS BASIS) | CULTURED FUNGI LEVEL (CFU/g) IN DRY PANEL | CULTURED FUNGI LEVEL (CFU/mL) IN EXTRACT OF PANEL |
|---|---|---|---|---|
| 12N | NONE | 0 | N.D. | N.D. |
| 12T | 1.25 | 2,494 | N.D. | 10 |

N.D. = none detected

Example 17: Effect of a Multifunctional Aldehyde on the Water-Soluble Endotoxin Level in Recovered Paper & Plastic Fragments A portion of sample #12 from Example 1 was treated with a multifunctional aldehyde and was then assayed for water-soluble endotoxins.

Recovered paper/plastic sample batch (500 g, as-is basis), #12 sample from Example 1) was loaded into a plastic bin (16.125"×11.25"×6.75"). The bin was then charged with powdered phthalaldehyde (1.25 g). The bin then shaken in order to obtain a uniform distribution of the phthalaldehyde on the fragments.

The treated paper/plastic fragments were conditioned for 90 minutes at a temperature of 65-70° F. and were then extracted with water as previously described in Example 2. Extract liquors were then collected and assayed for water-soluble endotoxin levels as previously described in Example 2. The results demonstrate that treatment of recovered paper/plastic fragments with phthalaldehyde substantially reduced the level of water-soluble endotoxin on the fragments.

TABLE 27

Water-Soluble Endotoxin Levels in Extracts Derived
from Recovered Paper/Plastic Fragments that were Treated with Phthalaldehyde

| SAMPLE | PHTHALALDEHYDE APPLICATION LEVEL (g) | PHTHALALDEHYDE LEVEL ON PAPER/PLASTIC FRAGMENTS (PPM, AS IS BASIS) | ENDOTOXIN CONCENTRATION (ng/mL) |
|---|---|---|---|
| 12N | NONE | 0 | 4,897 |
| 12T | 1.25 | 2,494 | 183 |

The results of Example 17 provide a demonstration that the untreated mixture of paper and plastic fragments had a water-soluble endotoxin level of about 48,970 ng per gram of fragments. Specifically, the extract had a volume of 200 mL and a water-soluble endotoxin level of 4,897 ng/mL. Thus, the total amount of water soluble endotoxin in the extract was 979,400 ng. This water-soluble endotoxin was derived from 20 g of untreated paper and plastic fragments. Thus, the treated paper and plastic fragments had a water-soluble endotoxin level of 48,970 ng/g.

The results of Example 17 provide a demonstration that the mixture of paper and plastic fragments treated with phthalaldehyde at a level of 2,494 ppm had a water-soluble endotoxin level of about 1,830 ng per gram of fragments. Specifically, the extract had a volume of 200 mL and a water-soluble endotoxin level of 183 ng/mL. Thus, the total amount of water soluble endotoxin in the extract was 36,600 ng. This water-soluble endotoxin was derived from 20 g of untreated paper and plastic fragments. Thus, the treated paper and plastic fragments had a water-soluble endotoxin level of 1,830 ng/g.

Para. A. A composite material comprising about 70 wt. % to about 99 wt. % of thermally consolidated recovered paper and plastic fragments, about 0.01 wt. % to about 0.40 wt. % of polymerization product of a multifunctional aldehyde, and about 0.0001 wt. % to about 0.02 wt. % of cross-linked endotoxin.

Para. B. The composite material of Para. A., wherein the multifunctional aldehyde is selected from the group consisting of malondialdehyde, succinic dialdehyde, glutaraldehyde, phthalaldehyde, or a combination of two or more thereof.

Para. C. A composite material comprising about 70 wt. % to about 99 wt. % of thermally consolidated recovered paper and plastic fragments, about 0.01 wt. % to about 0.40 wt. % of polymerization product of urea-aldehyde adducts, and about 0.0001 wt. % to about 0.02 wt. % of cross-linked endotoxin.

Para. D. The composite material of Para. C, wherein the urea-aldehyde adducts comprise a multifunctional aldehyde selected from the group consisting of malondialdehyde, succinic dialdehyde, glutaraldehyde, phthalaldehyde, or a combination of two or more thereof.

Para. E. The composite material of any one of Paras. A-D further comprising about 0.01 wt. % to about 2.0 wt. % of a biocide.

Para. F. The composite material of Para. E, wherein the biocide comprises boric acid, zinc borate, calcium borate, disodium octaborate tetrahydrate, elemental copper, elemental chromium, elemental arsenic, elemental silver, propiconazole, hydrogen peroxide, peracetic acid, cresol, dichlorophen, triclosan, centrimide, benzalkonium chloride, cetylpyridinium chloride, or 2,2-dibromo-3-nitrilopropionamide (DBNPA), or a combination of two or more thereof.

Para. G. The composite material of any one of Paras. A-F further comprising about 0.01 wt. % to about 2.0 wt. % of an odor blocker.

Para. H. The composite material of Para. G, wherein the odor blocker comprises activated carbon, sodium bicarbonate, zeolite, or iodine, or a combination of two or more thereof.

Para. I. The composite material of any one of Paras. A-H further comprising about 0.01 wt. % to about 2.0 wt. % of an insecticide.

Para. J. The composite material of Para. I, wherein the insecticide comprises permethrin, deltamethrin, or other pyrethroid esters, or a combination of two or more thereof.

Para. K. The composite material of any one of Paras. A-J further comprising less than about 5,000 ng of water-soluble endotoxin per gram of composite material.

Para. L. A method to prepare a composite material, the method comprising:

compressing and heating a mixture comprising paper fragments or plastic fragments, or a combination thereof, and a multifunctional aldehyde to form the composite material;

wherein the composite material comprises polymerization product of the multifunctional aldehyde; cross-linked endotoxin; and at least about 70 wt. % of the paper fragments or the plastic fragments, or the combination thereof.

Para. M. The method of Para. L, wherein the polymerization product of the multifunctional aldehyde is present in the composite material in an amount of about 0.01 wt. % to about 0.40 wt. %; and the cross-linked endotoxin is present in the composite material in an amount of about 0.0001 wt. % to about 0.02 wt. %.

Para. N. The method of Para. L or Para. M, wherein the multifunctional aldehyde is selected from the group consisting of malondialdehyde, succinic dialdehyde, glutaraldehyde, phthalaldehyde, or a combination of two or more thereof.

Para. O. The method of any one of Paras. L-N, wherein the multifunctional aldehyde is at least partially in the form of a urea-aldehyde adduct.

Para. P. The method of Para. O, wherein the urea-aldehyde adduct has a molar ratio of urea to multifunctional aldehyde of less than about 1.

Para. Q. The method of any one of Paras. L-P, wherein the method further comprises treating an initial mixture comprising the paper fragments or the plastic fragments, or the combination thereof, with the multifunctional aldehyde.

Para. R. The method of Para. Q, wherein the initial mixture is treated with the multifunctional aldehyde in an amount of about 200 ppm to about 4,000 ppm.

Para. S. The method of Para. Q or Para. R, wherein the multifunctional aldehyde is applied to the initial mixture as a pre-formed solution of a urea-aldehyde adduct.

Para. T. The method of Para. Q or Para. R, wherein the method further comprises treating the initial mixture with urea concomitantly with the multifunctional aldehyde.

Para. U. A method to prepare a composite material, the method comprising:

compressing and heating a mixture comprising paper fragments or plastic fragments, or a combination thereof, and a urea-aldehyde adduct to form the composite material; wherein the composite material comprises polymerization product of the urea-aldehyde adduct; cross-linked endotoxin; and at least about 70 wt. % of the paper fragments or the plastic fragments, or the combination thereof.

Para. V. The method of Para. U, wherein the polymerization product of the urea-aldehyde adduct is present in the composite material in an amount of about 0.01 wt. % to about 0.40 wt. %; and the cross-linked endotoxin is present in the composite material in an amount of about 0.0001 wt. % to about 0.02 wt. %.

Para. W. The method of Para. U or Para. V, wherein the urea-aldehyde adduct comprises a multifunctional aldehyde selected from the group consisting of malondialdehyde, succinic dialdehyde, glutaraldehyde, phthalaldehyde, or a combination of two or more thereof.

Para. X. The method of any one of Paras. U-W, wherein the method further comprises treating an initial mixture comprising the paper fragments or the plastic fragments, or the combination thereof, with the urea-aldehyde adduct.

Para. Y. The method of any one of Paras. Q-S or X, wherein the method further comprises treating the initial mixture with an odor blocker, a biocide, an insecticide, or a combination of two or more thereof.

Para. Z. The method of Para. Y, wherein the odor blocker comprises activated carbon, sodium bicarbonate, zeolite, or iodine, or a combination of two or more thereof.

Para. AA. The method of Para. Y, wherein the biocide comprises boric acid, zinc borate, calcium borate, disodium octaborate tetrahydrate, elemental copper, elemental chromium, elemental arsenic, elemental silver, propiconazole, hydrogen peroxide, peracetic acid, cresol, dichlorophen, triclosan, centrimide, benzalkonium chloride, cetylpyridinium chloride, or 2,2-dibromo-3-nitrilopropionamide (DBNPA), or a combination of two or more thereof.

Para. AB. The method of Para. Y, wherein the insecticide comprises permethrin, deltamethrin, or other pyrethroid esters, or a combination of two or more thereof.

Para. AC. The method of any one of Paras. Q-S or X-AB, wherein the method further comprises conditioning the initial mixture at about standard pressure for at least 5 minutes after the treating step but prior to compressing and heating to form the composite material.

Para. AD. The method of Para. AC, wherein the conditioning is performed at a temperature of about 50° F. to about 90° F.

Para. AE. The method of Para. AC, wherein the conditioning is performed at a temperature of about 60° F. to about 70° F.

Para. AF. The method of Para. AC, wherein the conditioning is performed at room temperature.

Para. AG. The method of any one of Paras. Q-S or X-AF, wherein the method further comprises sorting recovered waste materials to obtain the initial mixture; wherein the paper fragments or the plastic fragments, or the combination thereof, comprise gram-negative bacteria.

Para. AH. The method of Para. AG, wherein the paper fragments or the plastic fragments, or the combination thereof, of the initial mixture further comprise one or more fungi.

Para. AI. The method of any one of Paras. L-AH, wherein the method further comprises forming the mixture into a mat prior to compressing and heating the mixture.

Para. AJ. The method of any one of Paras. L-AI, wherein the compressing and heating are conducted at a temperature of at least 200° F.

Para. AK. The method of any one of Paras. L-AJ, wherein the compressing and heating are conducted at a temperature of about 300° F. to about 450° F.

Para. AL. The method of any one of Paras. L-AK, wherein the compressing and heating are conducted at a temperature of about 330° F. to about 450° F.

Para. AM. The method of any one of Paras. L-AL, wherein the compressing and heating are conducted for at least 1 minute.

Para. AN. The method of any one of Paras. L-AM, wherein the compressing and heating are conducted for about 1 minute to about 20 minutes.

Para. AO. The method of any one of Paras. L-AN, wherein the composite material further comprises less than about 5,000 ng of water-soluble endotoxin per gram of composite material.

Para. AP. The method of any one of Paras. L-AO, wherein the paper fragments or the plastic fragments, or the combination thereof, are present in the composite material in an amount of about 70 wt. % to about 99 wt. %.

Para. AQ. A composite material prepared according to the method of any one of Paras. L-AP.

Para. AR. A method to sanitize recovered waste materials, the method comprising:
treating a mixture comprising recovered waste materials with a multifunctional aldehyde to obtain sanitized recovered waste materials,
wherein the recovered waste materials comprise gram-negative bacteria; and
wherein the sanitized recovered waste materials comprise polymerization product of the multifunctional aldehyde and cross-linked endotoxin.

Para. AS. The method of Para. AR, wherein the multifunctional aldehyde is selected from the group consisting of malondialdehyde, succinic dialdehyde, glutaraldehyde, phthalaldehyde, or a combination of two or more thereof.

Para. AT. A method to sanitize recovered waste materials, the method comprising:
treating a mixture comprising recovered waste materials with a urea-aldehyde adduct to obtain sanitized recovered waste materials,
wherein the recovered waste materials comprise gram-negative bacteria; and
wherein the sanitized recovered waste materials comprise polymerization product of the urea-aldehyde adduct and cross-linked endotoxin.

Para. AU. The method of Para. AT, wherein the urea-aldehyde adduct comprises a multifunctional aldehyde selected from the group consisting of malondialdehyde, succinic dialdehyde, glutaraldehyde, phthalaldehyde, or a combination of two or more thereof.

Para. AV. The method of any one of Paras. AR-AU, wherein the recovered waste materials comprise paper fragments or plastic fragments, or a combination thereof; and the paper fragments or the plastic fragments, or the combination thereof comprise the gram-negative bacteria.

Para. AW. The method of Para. AV, wherein the paper fragments or the plastic fragments, or the combination thereof are present in the recovered waste materials in an amount of about 70 wt. % to about 99 wt. %.

Para. AX. The method of any one of Paras. AR-AW, further comprising conditioning the mixture at standard pressure for at least 5 minutes after the treating step.

Para. AY. The method of Para. AX, wherein the conditioning is performed at a temperature of about 50° F. to about 90° F.

Para. AZ. The method of Para. AX or Para. AY, wherein the conditioning is performed for at least 30 minutes.

Para. BA. The method of Para. AX or Para. AY, wherein the conditioning is performed for about 5 minutes to about 120 minutes.

Para. BB. The method of any one of Paras. AR-BA, wherein the sanitized recovered waste materials comprise less than about 5,000 ng of water-soluble endotoxin per gram of the sanitized recovered waste materials.

Para. BC. The method of any one of Paras. AR-BB, wherein the sanitized recovered waste materials further comprise less than about 1,000 ng of water-soluble endotoxin per gram of the sanitized recovered waste materials.

Para. BD. The composite material of any one of Paras. A-K, wherein the paper and plastic fragments are recovered from one or more waste streams selected from municipal solid waste, materials recycling facility residuals, post-commercial waste, and construction and demolition waste.

Para. BE. The method of any one of Paras. L-AP, wherein the paper fragments or the plastic fragments, or the combination thereof, are recovered from one or more waste streams selected from municipal solid waste, materials recycling facility residuals, post-commercial waste, and construction and demolition waste.

Para. BF. The method of any one of Paras. AR-BC, wherein the recovered waste materials are recovered from one or more waste streams selected from municipal solid waste, materials recycling facility residuals, post-commercial waste, and construction and demolition waste.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. Where a stated range includes one of or both lower and upper limits, ranges excluding either or both of those included limits are also included in the present disclosure. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composite material comprising about 70 wt. % to about 99 wt. % of thermally consolidated recovered paper and plastic fragments, about 0.01 wt. % to about 0.40 wt. % of polymerization product of a multifunctional aldehyde, and about 0.0001 wt. % to about 0.02 wt. % of cross-linked endotoxin.

2. The composite material of claim 1, wherein the multifunctional aldehyde is selected from the group consisting of malondialdehyde, succinic dialdehyde, glutaraldehyde, phthalaldehyde, or a combination of two or more thereof.

3. The composite material of claim 1 further comprising about 0.01 wt. % to about 2.0 wt. % of a biocide.

4. The composite material of claim 3, wherein the biocide comprises boric acid, zinc borate, calcium borate, disodium octaborate tetrahydrate, elemental copper, elemental chromium, elemental arsenic, elemental silver, propiconazole, hydrogen peroxide, peracetic acid, cresol, dichlorophen, triclosan, centrimide, benzalkonium chloride, cetylpyridinium chloride, or 2,2-dibromo-3-nitrilopropionamide (DBNPA), or a combination of two or more thereof.

5. The composite material of claim 1 further comprising about 0.01 wt. % to about 2.0 wt. % of an odor blocker.

6. The composite material of claim 5, wherein the odor blocker comprises activated carbon, sodium bicarbonate, zeolite, or iodine, or a combination of two or more thereof.

7. The composite material of claim 1 further comprising about 0.01 wt. % to about 2.0 wt. % of an insecticide.

8. The composite material of claim 7, wherein the insecticide comprises permethrin or deltamethrin, or a combination thereof.

9. The composite material of claim 1 further comprising less than about 5,000 ng of water-soluble endotoxin per gram of composite material.

* * * * *